(12) United States Patent
Chaurasia et al.

(10) Patent No.: US 10,803,598 B2
(45) Date of Patent: Oct. 13, 2020

(54) BALL DETECTION AND TRACKING DEVICE, SYSTEM AND METHOD

(71) Applicant: Gamelore Inc., Cupertino, CA (US)

(72) Inventors: Pankaj Chaurasia, Cupertino, CA (US); Atishay Jain, Delhi (IN); Raghav Gupta, Jaipur (IN); Nitesh Chourasia, Brentwood, TN (US); Ansh Chaurasia, Cupertino, CA (US)

(73) Assignee: Pankaj Chaurasia, Cupertino, CA (US)

( * ) Notice: Subject to any disclaimer, the term of this patent is extended or adjusted under 35 U.S.C. 154(b) by 99 days.

(21) Appl. No.: 16/012,574

(22) Filed: Jun. 19, 2018

(65) Prior Publication Data

US 2018/0374217 A1 Dec. 27, 2018

Related U.S. Application Data

(60) Provisional application No. 62/523,171, filed on Jun. 21, 2017.

(51) Int. Cl.
| | | |
|---|---|---|
| *G06K 9/00* | (2006.01) | |
| *G06T 7/20* | (2017.01) | |
| *G06K 9/62* | (2006.01) | |
| *G06T 7/246* | (2017.01) | |
| *G06K 9/52* | (2006.01) | |
| *G06K 9/32* | (2006.01) | |

(52) U.S. Cl.
CPC ........... *G06T 7/20* (2013.01); *G06K 9/00724* (2013.01); *G06K 9/52* (2013.01); *G06K 9/6227* (2013.01); *G06K 9/6268* (2013.01); *G06T 7/246* (2017.01); *G06K 2009/3291* (2013.01); *G06T 2207/10016* (2013.01); *G06T 2207/10024* (2013.01); *G06T 2207/20004* (2013.01); *G06T 2207/30224* (2013.01)

(58) Field of Classification Search
USPC .................................................. 382/103, 204
See application file for complete search history.

(56) References Cited

U.S. PATENT DOCUMENTS

| | | | |
|---|---|---|---|
| 6,233,007 B1 | 5/2001 | Carlbom et al. | |
| 6,304,833 B1 * | 10/2001 | Ferkinhoff | G01S 5/18 324/345 |
| 9,275,470 B1 | 3/2016 | Forkosh et al. | |
| 2007/0092110 A1 | 4/2007 | Xu et al. | |
| 2008/0181453 A1 | 7/2008 | Xu et al. | |
| 2009/0002489 A1 | 1/2009 | Yang et al. | |
| 2010/0210377 A1 | 8/2010 | Lock | |
| 2011/0142282 A1 | 6/2011 | Srikrishnan et al. | |
| 2011/0254976 A1 | 10/2011 | Garten | |
| 2011/0291925 A1 | 12/2011 | Israel et al. | |
| 2015/0055821 A1 | 2/2015 | Fotland | |

* cited by examiner

*Primary Examiner* — Suhail Khan
(74) *Attorney, Agent, or Firm* — Haverstock & Owens LLP

(57) ABSTRACT

A ball detection and tracking system including one or more visual sensors and a detection and tracking agent that ranks a plurality of blob detection algorithms based on a detection metric and uses a selected base detection algorithm to identify one or more candidate blobs. Based on this, the agent is able to generate a track for the candidate blobs and assign one or more subsequent candidate blobs to a best ranked one of the tracks if the assignment satisfies a cost threshold.

31 Claims, 5 Drawing Sheets

| Match Parameters | Match Parameters | Practice Parameters |
| --- | --- | --- |
| Spin/Axis | 1st Serve %age | Number of strokes hit (each stroke) |
| Force of shot | First serve Points Won | Number of quality strokes hit (each stroke) |
| Trajectory | 2nd serve points won | Revolutions on ground strokes |
| Flight duration | 1st ball FH % on first serve | Speed of shots (each stroke) |
| Speed after shot | 1st ball FH % on 2nd serve | Speed/Revolution (groundstrokes) |
| Height of bounce | Winners (FH, BH, Serve) | Spray chart of Crossing plane on serve |
| Steps to hit | Errors (FH, BH, Volley) | Serve game (can let you share an idea) |
| Time to hit | % of points won at net | |
| Arrival speed | Spray chart of all shot contact points (FH/BH/Ret) | |
| Shot Classification | Spray chart of 1st and 2nd serve contact points | |
| Serve toss ht | Spray chart of 1st and 2nd serve opponent return contact point | |
| Shot Biomechanics | 1st Serve Return % won | |
| Serve Type | 2nd Serve Return % won | |
| Errors | Spray chart of returns contact points (1st, 2nd) | |
| Heat map | Spray chart of 1st ball after return contact points (1st, 2nd) and opponent | |
| Bounce to racquet distance | Height over net charts (1st Serve, 2nd Serve, 1st return, 2nd return, Groundstrokes) | |

Fig. 4

BALL DETECTION AND TRACKING DEVICE, SYSTEM AND METHOD

RELATED APPLICATIONS

This application claims priority under 35 U.S.C. § 119(e) of the U.S. provisional patent application Ser. No. 62/523,171 filed Jun. 21, 2017, and titled "METHOD AND APPARATUS TO HELP TENNIS PLAYERS AND COACHES WITH REAL TIME STATISTICS OF PLAYER'S PERFORMANCE IN AN AFFORDABLE WAY," which is hereby incorporated by reference.

FIELD OF THE INVENTION

The present invention relates to the field of ball tracking. More particularly, the present invention relates to the real-time detection, tracking and analysis of balls.

BACKGROUND OF THE INVENTION

One field in which real time tracking would be particularly desirable, but is not currently greatly utilized, is in the field of sports. For example, continuous tracking of a tennis ball during a tennis match provides valuable information about the skill and strategy of a player because information such as ball speed and ball placement would be readily obtainable therefrom. However, real time tracking of objects such as athletes or balls in a sporting event is challenging, especially because it is difficult to obtain a clean segmentation of the ball from the background in view of changing lighting conditions, variations in clothing worn by athletes (especially with regard to color), differences in the characteristics (for example, reflectivity) of playing surfaces (grass, clay, hardwood, ice, etc.), and the fast and dynamic movement of athletes. Another factor is the presence of other moving objects or moving people (such as other players on the field, spectators, and the like). As a result, an improved ball detection and tracking device is needed.

SUMMARY OF THE INVENTION

A ball detection and tracking system including one or more visual sensors and a detection and tracking agent that ranks a plurality of blob detection algorithms based on a detection metric and uses a selected base detection algorithm to identify one or more candidate blobs. Based on this, the agent is able to generate a track for the candidate blobs and assign one or more subsequent candidate blobs to a best ranked one of the tracks if the assignment satisfies a cost threshold.

A first aspect is directed to a ball detection and tracking system. The system comprises a plurality of visual detectors each having one or more light sensors for sensing a plurality of frames of images and a mobile ball detection and tracking device coupled with the visual detectors for receiving the frames from the visual detection devices, the ball detection and tracking device having a processor and a non-transitory computer-readable memory storing a detection and tracking agent including a detection module that ranks a plurality of blob detection algorithms based on a detection metric, selects the best ranked detection algorithm to be a base detection algorithm, and uses the base detection algorithm to identify one or more first candidate blobs within a first frame of the frames and one or more second candidate blobs within a second frame of the frames and a tracking module that generates a track for each of the first candidate blobs including a predicted location of each of the tracks within the second frame, ranks each of the second candidate blobs based on a blob metric and each of the tracks based on a track metric, and assigns one of the second candidate blobs to the best ranked one of the tracks if the assignment satisfies a cost threshold as measured by a cost function. In some embodiments, the tracking module determines whether one of the tracks is a ball track based on one or more of the group consisting of an age of the one of the tracks, visibility of the one of the tracks, and a number of the frames in which the one of the tracks has had the best rank based on the track metric.

In some embodiments, the tracking module determines if any of the second candidate blobs satisfy the cost threshold for the best ranked one of the tracks, and of those that do satisfy the cost threshold, assigns the second blob having the best rank to the best ranked one of the tracks. In some embodiments, at each iteration, after excluding any of the second candidate blobs that have already been assigned and any of the tracks that have been assigned to, the tracking module iteratively determines if any of the second candidate blobs satisfy the cost threshold for the best ranked one of the tracks and of those that do satisfy the cost threshold, assigns the second blob having the best rank to the best ranked one of the tracks until all of the tracks have been assigned to. In some embodiments, the cost threshold is dynamically adjusted each time one of the blobs is associated with one of the tracks based on a cost of associating the one of the blobs with the one of the tracks as measured by the cost function.

In some embodiments, when the predicted location of one of the tracks lies within one of the second blobs, the tracking module assigns the one of the second blobs to the one of the tracks even if assigning different one of the second blobs would be more cost efficient as measured by the cost function. In some embodiments, after using the base detection algorithm, the detection module uses one or more other detection algorithms of the plurality of detection algorithms to identify one or more other first candidate blobs within a first frame of the frames and one or more other second candidate blobs within a second frame of the frames, classifies one of the second blobs as a ball blob, and for each of the other detection algorithms, classifies one of the other second blobs identified by the other detection algorithm as other ball blobs and combines the characteristics of the ball blob and each of the other ball blobs to generate a unionized blob. In some embodiments, the second frame has an initial exposure level, the detection module adjusts the second frame to have a second exposure level and uses the base detection algorithm to identify one or more other second candidate blobs within the second frame as adjusted, classifies one of the second blobs as a ball blob and one of the other second blobs as another ball blob and creates a unionized ball blob that only includes pixels that are common to both the ball blob and the other ball blob.

In some embodiments, the tracking module selects the cost function from a plurality of stored cost functions based on a cost score of each of the cost functions. In some embodiments, the tracking module determines if the assigning of the one of the second candidate blobs to the best ranked one of the tracks satisfies a second cost threshold as measured by a second cost function and refrains from making the assignment if the assignment does not satisfy the second cost threshold. In some embodiments, the tracking module refrains from generating a track for one or more of the first blobs if the blobs do not satisfy a blob metric threshold as measured by the blob metric.

A second aspect is directed to a mobile ball detection and tracking device. The device comprises a plurality of visual detectors each having one or more light sensors for sensing a plurality of frames of images and a non-transitory computer-readable memory storing a detection and tracking agent including a detection module that ranks a plurality of blob detection algorithms based on a detection metric, selects the best ranked detection algorithm to be a base detection algorithm, and uses the base detection algorithm to identify one or more first candidate blobs within a first frame of the frames and one or more second candidate blobs within a second frame of the frames and a tracking module that generates a track for each of the first candidate blobs including a predicted location of each of the tracks within the second frame, ranks each of the second candidate blobs based on a blob metric and each of the tracks based on a track metric, and assigns one of the second candidate blobs to the best ranked one of the tracks if the assignment satisfies a cost threshold as measured by a cost function. In some embodiments, the tracking module determines whether one of the tracks is a ball track based on one or more of the group consisting of an age of the one of the tracks, visibility of the one of the tracks, and a number of the frames in which the one of the tracks has had the best rank based on the track metric.

In some embodiments, the tracking module determines if any of the second candidate blobs satisfy the cost threshold for the best ranked one of the tracks, and of those that do satisfy the cost threshold, assigns the second blob having the best rank to the best ranked one of the tracks. In some embodiments, at each iteration, after excluding any of the second candidate blobs that have already been assigned and any of the tracks that have been assigned to, the tracking module iteratively determines if any of the second candidate blobs satisfy the cost threshold for the best ranked one of the tracks and of those that do satisfy the cost threshold, assigns the second blob having the best rank to the best ranked one of the tracks until all of the tracks have been assigned to. In some embodiments, the cost threshold is dynamically adjusted each time one of the blobs is associated with one of the tracks based on a cost of associating the one of the blobs with the one of the tracks as measured by the cost function. In some embodiments, when the predicted location of one of the tracks lies within one of the second blobs, the tracking module assigns the one of the second blobs to the one of the tracks even if assigning different one of the second blobs would be more cost efficient as measured by the cost function.

In some embodiments, after using the base detection algorithm, the detection module uses one or more other detection algorithms of the plurality of detection algorithms to identify one or more other first candidate blobs within a first frame of the frames and one or more other second candidate blobs within a second frame of the frames, classifies one of the second blobs as a ball blob, and for each of the other detection algorithms, classifies one of the other second blobs identified by the other detection algorithm as other ball blobs and combines the characteristics of the ball blob and each of the other ball blobs to generate a unionized blob. In some embodiments, the second frame has an initial exposure level, the detection module adjusts the second frame to have a second exposure level and uses the base detection algorithm to identify one or more other second candidate blobs within the second frame as adjusted, classifies one of the second blobs as a ball blob and one of the other second blobs as another ball blob and creates a unionized ball blob that only includes pixels that are common to both the ball blob and the other ball blob.

In some embodiments, the tracking module selects the cost function from a plurality of stored cost functions based on a cost score of each of the cost functions. In some embodiments, the tracking module determines if the assigning of the one of the second candidate blobs to the best ranked one of the tracks satisfies a second cost threshold as measured by a second cost function and refrains from making the assignment if the assignment does not satisfy the second cost threshold. In some embodiments, the tracking module refrains from generating a track for one or more of the first blobs if the blobs do not satisfy a blob metric threshold as measured by the blob metric.

A third aspect is directed to a method of detecting and tracking a ball. The method comprises sensing a plurality of frames of images with a plurality of visual detectors each having one or more light sensors, receiving the frames with a mobile ball detection and tracking device, ranking a plurality of blob detection algorithms based on a detection metric, selecting the best ranked detection algorithm to be a base detection algorithm, and using the base detection algorithm to identify one or more first candidate blobs within a first frame of the frames and one or more second candidate blobs within a second frame of the frames with the ball detection and tracking device and generating a track for each of the first candidate blobs including a predicted location of each of the tracks within the second frame, ranking each of the second candidate blobs based on a blob metric and each of the tracks based on a track metric, and assigning one of the second candidate blobs to the best ranked one of the tracks if the assignment satisfies a cost threshold as measured by a cost function with the ball detection and tracking device. In some embodiments, the method further comprises determining with the tracking module whether one of the tracks is a ball track based on one or more of the group consisting of an age of the one of the tracks, visibility of the one of the tracks, and a number of the frames in which the one of the tracks has had the best rank based on the track metric.

In some embodiments, the method further comprises determining if any of the second candidate blobs satisfy the cost threshold for the best ranked one of the tracks, and of those that do satisfy the cost threshold, assigning the second blob having the best rank to the best ranked one of the tracks. In some embodiments, the method further comprises, at each iteration, after excluding any of the second candidate blobs that have already been assigned and any of the tracks that have been assigned to, iteratively determining if any of the second candidate blobs satisfy the cost threshold for the best ranked one of the tracks and of those that do satisfy the cost threshold, assigning the second blob having the best rank to the best ranked one of the tracks until all of the tracks have been assigned to. In some embodiments, the method further comprises dynamically adjusting the cost threshold each time one of the blobs is associated with one of the tracks based on a cost of associating the one of the blobs with the one of the tracks as measured by the cost function.

In some embodiments, the method further comprises, when the predicted location of one of the tracks lies within one of the second blobs, assigning the one of the second blobs to the one of the tracks even if assigning different one of the second blobs would be more cost efficient as measured by the cost function. In some embodiments, the method further comprises, after using the base detection algorithm, using one or more other detection algorithms of the plurality of detection algorithms to identify one or more other first candidate blobs within a first frame of the frames and one or more other second candidate blobs within a second frame of the frames; classifying one of the second blobs as a ball blob, and for each of the other detection algorithms, classifies one of the other second blobs identified by the other detection algorithm as other ball blobs; and combining the characteristics of the ball blob and each of the other ball blobs to generate a unionized blob.

In some embodiments, the second frame has an initial exposure level, wherein the method further comprises adjusting the second frame to have a second exposure level and uses the base detection algorithm to identify one or more other second candidate blobs within the second frame as adjusted, classifying one of the second blobs as a ball blob and one of the other second blobs as another ball blob and creating a unionized ball blob that only includes pixels that are common to both the ball blob and the other ball blob. In some embodiments, the method further comprises selecting the cost function from a plurality of stored cost functions based on cost score of each of the cost functions. In some embodiments, the method further comprises determining if the assigning of the one of the second candidate blobs to the best ranked one of the tracks satisfies a second cost threshold as measured by a second cost function and refraining from making the assignment if the assignment does not satisfy the second cost threshold. In some embodiments, the method further comprises refraining from generating a track for one or more of the first blobs if the blobs do not satisfy a blob metric threshold as measured by the blob metric.

BRIEF DESCRIPTION OF THE DRAWINGS

FIG. 4 illustrates determined exemplary ball parameters according to some embodiments.

DETAILED DESCRIPTION OF THE INVENTION

Figure 1:
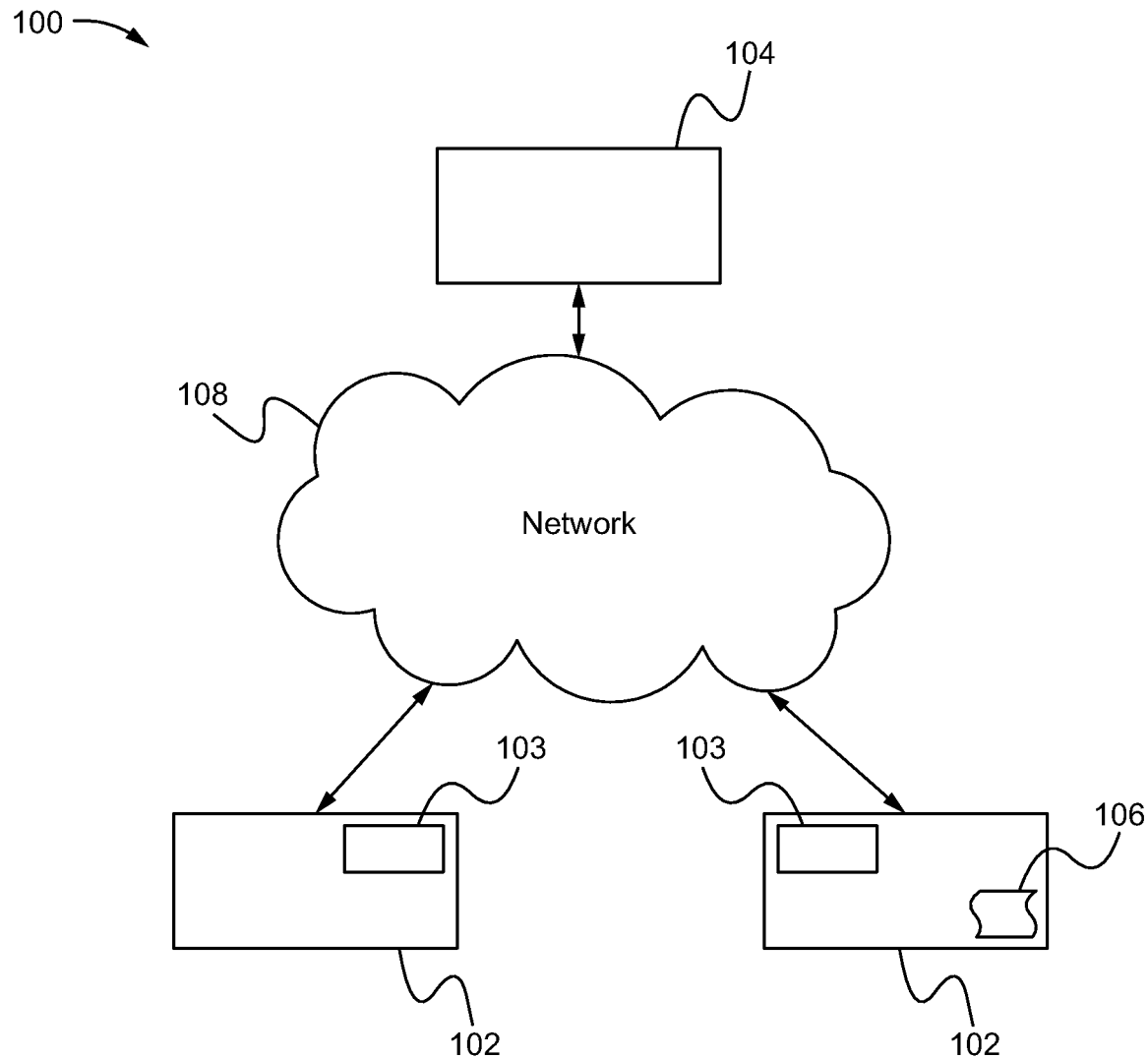
FIG. 1 illustrates a ball detection and tracking system according to some embodiments.

Embodiments described herein are directed to a ball detection and tracking system including one or more visual sensors and a detection and tracking agent on one or more ball detection and tracking devices. The tracking agent ranks a plurality of blob detection algorithms based on a detection metric and uses a selected base detection algorithm to identify one or more candidate blobs. Based on this, the agent is able to generate a track for the candidate blobs and assign one or more subsequent candidate blobs to a best ranked one of the tracks if the assignment satisfies a cost threshold. As a result, the agent improves and upgrades the operation of the devices by enabling the devices to detect and track balls in order to record and display multiple characteristics of the motion of the balls during or outside of game play. For example, the devices are able to determine real time match statistics of a tennis game to help players and coaches improve their performance. Furthermore, this function is able to be provided without the need for the visual sensors being fixed sensors thereby reducing cost by enabling use of off-the-shelf cameras or state of the art cell-phone cameras to record the frames and thereby eliminating costly and fixed components of the existing solutions.

The term "ball" as used herein is able to be sports balls (e.g. tennis balls, ping pong balls, baseballs, cricket balls), non-sports balls or other objects.

The term "blob" as used herein refers to one or more adjacent or contiguous pixels within a frame that are identified as possibly indicating the presence of a ball.

The term "track" as used herein refers to a path of predicted motion of an object or ball represented by blobs from a plurality of frames that have been associated with each other as being indicative of the same object in motion. The path defined by the track includes the centroids of the blobs from which the track is derived. Correspondingly, a "predicted track" is a location within a subsequent frame where a centroid of a blob caused by the object corresponding to the track is predicted to be located based on the previous characteristics of the track already identified.

The term "rank score" as used herein represents resemblance of a track's motion to that of motion of a ball (e.g. tennis ball). The rank score is thereby able to identify a track which is showing closest ball motion behavior should get maximum chance to be associated with blob centroids among all the tracks currently identified. In some embodiments, for projectile motion, rank score is based on parabolic fit of the track trajectory (and therefore the trajectory of the ball which it is supposed to represent), the number of changes in signs of the track in x coordinate (e.g. a penalty for each change), the variance of acceleration in y direction (acceleration in y direction is supposed to be as constant as possible) and variance in track angle slope (depicting smoothness of trajectory). In some embodiments, for toss motion, rank score is based on variance of track angle since the trajectory is roughly vertical (track angle supposed to remain fairly constant), variance of acceleration in y direction (acceleration in y direction is supposed to be as constant as possible) and the number of changes in signs of change y coordinate and the number of same sign of change of y coordinates (e.g. a penalty for each change).

The term "blob score" as used herein represents how closely any blob (which is competing with other blobs to be associated with a track) appears to match the blobs which have already been associated with the track. Centroids are devoid of information describing the blob and its closeness to possibly being a ball. As a result, the blob score based sorting gives maximum chance for blob of the ball to be associated to the track showing closest ball track behavior. The blob score is also able to be used as a threshold value used to filter out lower quality blobs and as a result optimizes the system as cost need not be calculated for all the blob centroids but only for those which are showing ball like characteristics and thus meet the blob score threshold. In some embodiments, the blob score comprises two types of sub blob scores—Local Blob Score (LBS) and Global Blob Score (GBS). LBS is calculated using the change in Rank Score before and after assignment and color likelihood local which represents the closeness of the blob under test to the blobs already captured by the ball track or any other track. GBS is calculated using Circularity, color likelihood global calculated using pre-calculated or initially calculated ball Gaussian mixture model (GMM) and Eccentricity. Accordingly, Global Blob Score does not change for a particular blob, but local blob score for a particular blob changes based on the track which is being used to calculate it. The combined score will be the blob score of a blob with respect to a particular track.

The term "ball track detect score" (BTDS) as used herein represents the confidence with which ball track is generated using a particular detection algorithm.

The term "detect score" as used herein is able to be a score assigned to all detection algorithms being used. Specifically, the detect score denotes the confidence of detecting the ball. Based on this score, the best detection algorithm is able to be chosen which can be treated as base detection algorithm. This is able to be done by sorting the scores in ascending order and picking the first algorithm corresponding to the best score. The base detection algorithm is able to be used until the ball track is declared, following which the other algorithms will be used in the same sorted order to find the ball in case of invisibility/bad association.

The term "track health score" (THS) as used herein is based on the rank score and blob score. These scores are evaluated at every frame and represent how well blobs are 'fitting' in the track, and how 'similar' are they to each other. These scores help in detection of incorrect association of blobs to tracks. This is used to assess correctness of data association. When THS falls below a threshold the system is able to discard the current set of blobs (identified by a current blob detection algorithm) and run another blob detection algorithm to find a new set of blobs, wherein only blobs that meet the THS threshold are used for data association (e.g. with the existing tracks).

The term "track score" (TS) as used herein is a score using to identify the ball track from collection of all potential ball tracks in the system. Track Score takes into account motion history of the track (e.g. the centroid of previous blobs assigned to the track). This score evaluates how "well-behaved" a given track is in terms of its motion. A track with very erratic (e.g. zig-zag motion) will have low TS, and another track which exhibits smooth parabolic motion (like that of a projectile or tossed up ball) will have high TS.

The term "visibility" as used herein is equal to number of frames in which the ball is detected in relation to a total number of frames under consideration. Invisibility occurs when no blob is found which is fit to be associated to ball track (e.g. as determined by a cost threshold).

FIG. 1 illustrates a ball detection and tracking system 100 according to some embodiments. As shown in FIG. 1, the system 100 comprises one or more ball detection and tracking computing devices 102 each having a display, a processor, a wireless receiver/transmitter, a video capture feature/sensor 103 and a memory storing a user interface. Further the system 100 comprises one or more servers 104, wherein the computing devices 102 and the servers 104 are communicatively coupled via one or more networks 108. Although as shown in FIG. 1, a single server 104 is coupled with two computing devices 102, it is understood that the system is able to comprise any number of servers 104 coupled directly or indirectly with any number of computing devices 102. Additionally, although shown separately in FIG. 1, in some embodiments the one or more of the servers 104 and one or more of the computing devices 102 are able to comprise a combined single device that performs all of the functions of the devices that they are a combination of as described herein (e.g. a computing device 102 and a server 104). Alternatively or in addition, one or more of the ball detection and tracking computing devices 102 as shown in FIG. 1 are able to represent two or more separate devices that perform separate parts of the functions of the devices 102 described herein (e.g. a video capture device that performs the video capturing functions and a processing/user interface device that includes an agent as described below to perform the data analysis and presentation functions). The networks 108 are able to be one or a combination of wired or wireless networks as are well known in the art.

The system 100 is able to further comprise a detection and tracking agent/application 106 that is stored and/or operated on one or both of the servers 104 and the devices 102. For example, the one or more servers 104 are able to store at least a portion of the tracking agent/application 106 including a graphic user interface for the agent 106 on a server memory. As a result, the servers 104 are able to enable a user to download the application 106 from the servers 104 over the network 108 onto one or more of the computing devices 102. After being downloaded onto a computing device 102, the application 106 is able to create and use an application database within the local memory on the device 102 to store and utilize data necessary for local operation.

Alternatively, some or all of the data is able to be stored/remain in a server database on the memory on the servers 104 such that the application 106 is able to connect to the servers 104 over the networks 108 in order to utilize the data on the server database. For example, the locally executing application 106 on the devices 102 is able to remotely communicate with the servers 104 over the network 108 to perform any features of the application 106 and/or access any data on the server database not available with just the data on the device 102. In some embodiments, the same data is stored on both the server database and one or more of the devices 102 such that either local or remote data access is possible. In such embodiments, the data on the servers 104 and/or devices 102 is able to be synchronized by the application 106. In some embodiments, the server database and/or application 106 is distributed across a plurality of the servers 104. Alternatively or in addition, one or more of the servers 104 are able to store all of the database and/or application data. In such embodiments, the servers 104 are able to perform a synchronization process such that all the databases and/or other application data are synchronized.

Alternatively, the application/agent 106 is able to be replaced or supplemented with a website stored on the server memory and executed by the servers 104, wherein the website provides some or all of the functionality of the application/agent 106 with a website user interface that is substantially similar to the application user interface. In such embodiments, a device 102 is able to access the agent and/or website and utilize the features of the agent and/or website with a web browser that communicates with the servers 104 over the networks 108. In some embodiments, the functionality of the website is able to be limited to facilitating the downloading of the application 106 onto one or more devices 102. In other words, the application/agent 106 is able to operate on just the servers 104, just the devices 102 or a combination of the servers 104 and devices 102. Accordingly, it should be noted that although described according to an exemplary functional distribution herein, other distributions of the functions of the application/agent 106 between the servers 104 (via the agent/website) and the devices 102 (via the application) are contemplated but not included for the sake of brevity. In some embodiments, the application 106 is able to be already installed in the device 102 or is able to be part of the software or firmware operating the device 102 itself.

The computing devices 102 are able to be a dedicated ball detection and tracking device or other computing devices having a memory for storing at least a portion of the application 106 and/or video capture features (e.g. cameras, light sensors). In some embodiments, the devices 102 comprise a display (e.g. a touchscreen). Examples of suitable computing devices 102 include smart jewelry (e.g., smartwatch), a personal computer, a laptop computer, a computer workstation, a server, a mainframe computer, a handheld computer, a personal digital assistant, a cellular/mobile telephone, an IOT device, a game console, a digital camera, a digital camcorder, a camera phone, a smart phone, a portable music player, a tablet computer, a mobile device, a video player or any other suitable computing device.

In some embodiments, a plurality of the sensors 103 (e.g. on a plurality of devices 102) are able to be positioned to capture different perspectives of the same view (e.g. facing opposite sides of a tennis court). As a result, in such embodiments the sensors 103 are able to view the ball simultaneously or concurrently and their captured frames (e.g. the information derived therefrom) are able to be compared to each other in order to enhance the ball detection and tracking of the system. For example, the use of the track health score described below is able to be predicated on a plurality of sensors 103 viewing the ball at the same time. Alternatively or in addition, in some embodiments a plurality of the sensors 103 (e.g. on a plurality of devices 102) are able to be positioned adjacent to each other such that they capture adjacent views (e.g. abutting or partially but not fully overlapping views) to capture different views that are spatially related to each other (e.g. views of either side of a tennis court). As a result, in such embodiments the sensors 103 are able to maintain view of the ball when it exits the view of one sensor 103 and enters the view of an adjacent sensor 103. For example, this setup is able to be utilized for stitching views together in order to create a ball track as described below.

Figure 2:
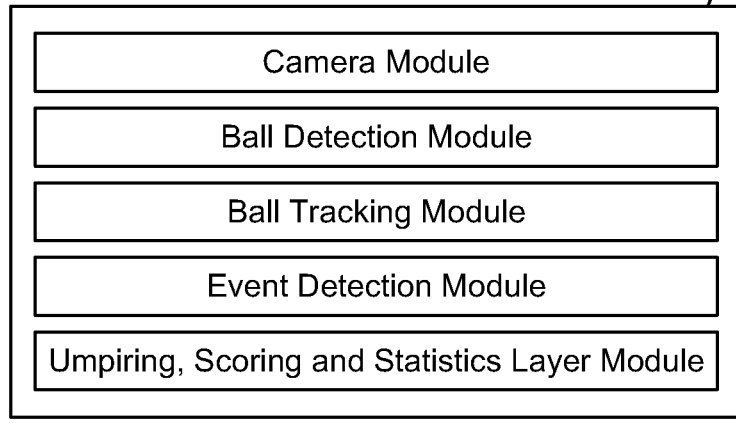
FIG. 2 illustrates a detection and tracking agent/application according to some embodiments.

As shown in FIG. 2, the application 106 is able to comprise a camera module, a ball detection module, a ball tracking module, an event detection module and an umpiring, scoring and statistics module, wherein the modules use the application database to store, maintain and access data necessary for the operation of the application 106. The camera module enables the application 106 to control the operation of one or more visual sensors (e.g. cameras) of the device 102. In some embodiments, the camera module controls input frame/video focus, exposure, white balance, resolution, frame rate, pixel format and/or other image capture function/parameters. The ball detection module is able to automatically perform the ball detection process described in detail below when a user selects a capture function of the application 106. Similarly, the ball tracking module is able to automatically perform the ball tracking process also described in detail below based on the results of the ball detection process. During the operation of the ball detection and tracking modules, the event detection module monitors for events such as ball bounces or deflections (e.g. due to hitting the ground, hitting a racquet, hitting a net, etc.) based on sudden changes in the movement (e.g. direction, speed, spin, trajectory) of the ball as identified by the detection/tracking modules and/or other factors. Finally, the umpiring, scoring and statistics layer module is able to provide an interactive results description on the device 102 based on one or more prior capture function sessions. In performing their respective functions, the modules are each able to access the servers 104 and/or any other devices 102 as described above.

Additionally, in some embodiments the application is able to comprise a login and registration module, wherein the application user interface is configured to enable users to utilize the application modules. The login and registration module enables a user to create a user profile/account by inputting username and password information via the graphical user interface that is then associated with the account such that the information is able to be used to identify the user when logging onto the application. Alternatively, the login information is able to be omitted and a user is able to use the application without creating a user account or logging in. After a user account is created, the user is able to access the account by entering the username and password in order to identify themselves to the application.

Detection

Figure 3A:
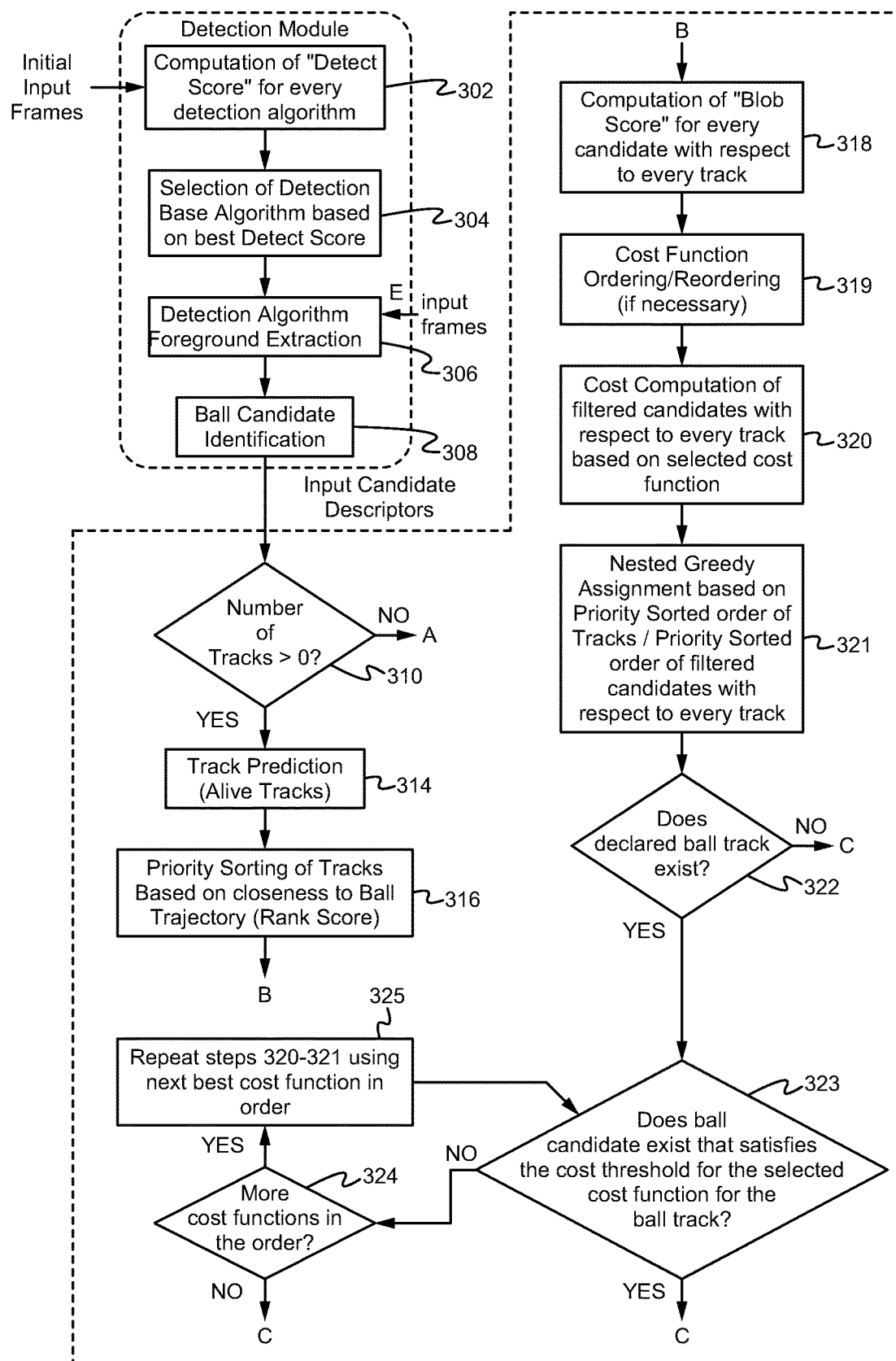
FIGS. 3A and 3B illustrate a method of detecting and tracking a ball according to some embodiments.
Figure 3B:
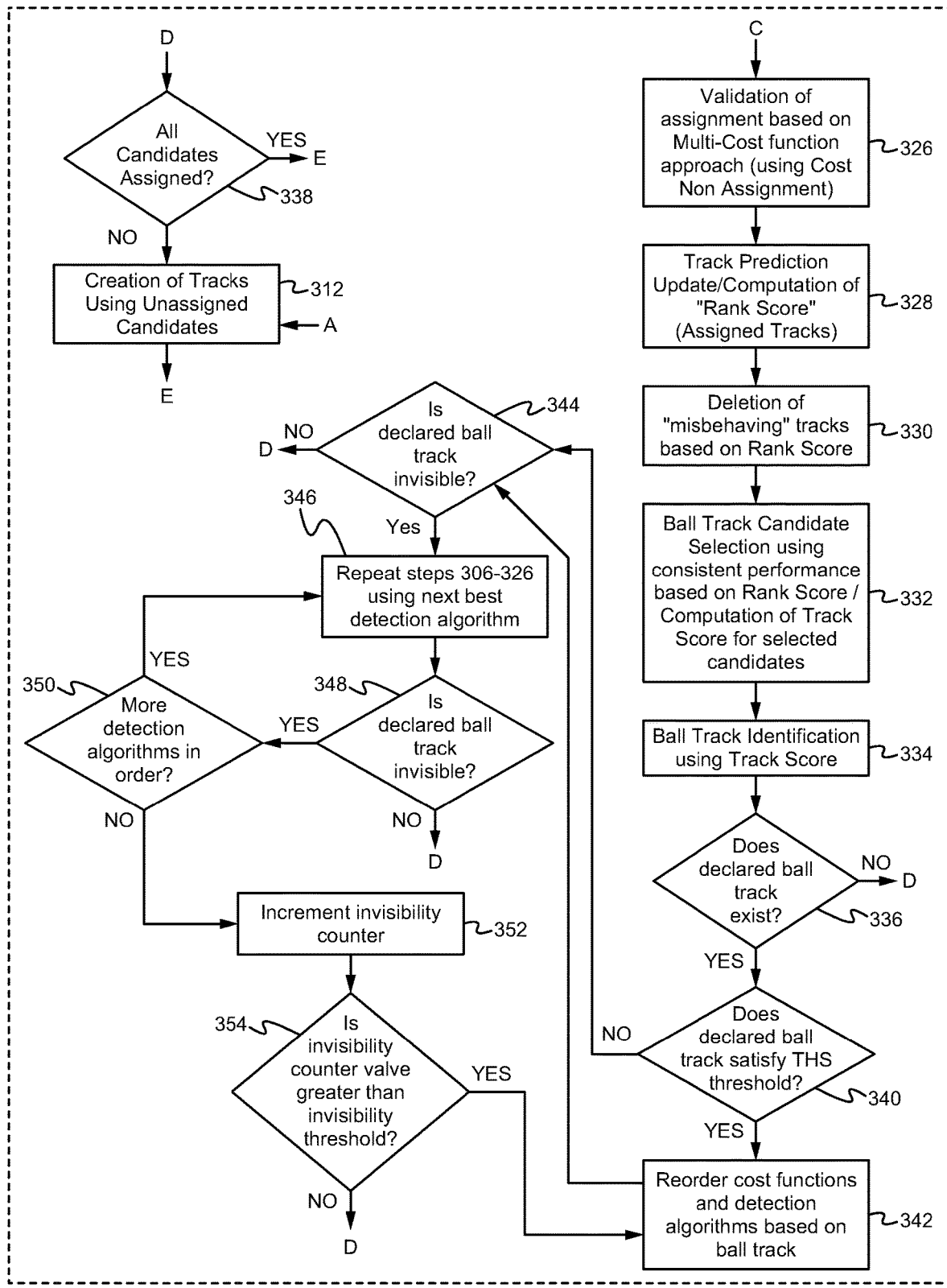

FIGS. 3A and 3B illustrate a ball detection and tracking method using the system 100 according to some embodiments. In some embodiments, the method of FIG. 3 is able to be performed separately for each visual detector 103 (because each visual detector is able to have a different view and thus subject to different ball detection and tracking needs). As shown in FIG. 3, upon selection by a user of the capture function, the camera module causes the sensors 103 to begin inputting video and the detection module applies each of a set of possible detection algorithms of the application 103 to an initial set of the input frames such that each returns detected blobs (e.g. potential balls) identified within the frames. The detection module then determines a detect score for the results of each of the algorithms at the step 302. The detect score is able to be based on one or more of a variation in area of the blobs over the initial frames, a variation in shape of the blobs over the initial frames, a rate of change in the angle/slope of the trajectory of the blobs over the initial frames, invisibility of the blobs for one or more of the initial frames (e.g. inability to identify a blob in a subsequent frame that corresponds to the predicted track of a blob based on identification of the blob over previous frames based on a cost of association function threshold), and/or a quantity of blobs identified as not being the ball. In some embodiments, the application 106 displays a prompt on the device 102 asking the user to perform specified actions for the calibration period. In some embodiments, the detect score is calculated as follows:

$$\text{Detect Score} = NoB_{avg} + AoB_{avg} + BTDS \quad (1)$$

where
$NoB_{avg}$—Average number of blobs given by $$NoB_{avg} = \frac{\sum_{i=1}^{N} NoB_i}{N} \quad (2)$$

Where
N—Number of frames
$NoB_i$—Number of blobs in it frame
$AoB_{avg}$—Average Area of blobs given by $$AoB_{avg} = \frac{\sum_{i=1}^{N} \frac{\sum_{j=1}^{n_i} AoB_j}{n_i}}{N} \quad (3)$$

Where
N—Number of frames
$AoB_j$—Area of $j^{th}$ blob in pixels
$n_i$—Number of blobs in $i^{th}$ frame
BTDS—Ball Track Detect Score given by:

$$BTDS = \sigma_{KG}^2 - KG_{avg} + NoSB_{avg} + DoSB_{avg} - LBS_{avg} - AoBT - GBS_{avg} + abs(\sigma_{area}^2) \quad (4)$$

Where $$\sigma_{KG}^2 = \frac{\sum_{i=1}^{AoBT}(KG_i - \mu_{KG})^2}{AoBT} \quad (5)$$

Where
$KG_i$—Kalman Gain when age of ball track equals 'i'

$$\mu_{KG} = \frac{\sum_{i=1}^{AoBT} KG_i}{AoBT} \quad (6)$$

AoBT—age of ball track $$KG_{avg} = \frac{\sum_{i=1}^{AoBT} KG_i}{AoBT} \quad (7)$$

$$NoSB_{avg} = \frac{\sum_{i=1}^{AoBT} NoSB_i}{AoBT} \quad (8)$$

Where
$NoSB_i$—Number of Stray Blobs around the ball blob within a circular ROI when age of ball track equals 'i'

$$DoSB_{avg} = \frac{\sum_{i=1}^{AoBT} \sum_{j=1}^{NoSB_i} DoSB_j / NoSB_i}{AoBT} \quad (9)$$

Where
$DoSB_j$—Euclidean distance of Stray Blob 'j' around the ball blob within a circular ROI when age of ball track equals 'i'

$$LBS_{avg} = \frac{\sum_{i=1}^{AoBT} LBS_i}{AoBT} \quad (10)$$

Where
$LBS_i$—Local Blob Score of ball blob when age of ball track equals 'i' given by $$LBS = \Delta \text{ Rank Score} + \text{Color Likelihood}_{local} \quad (11)$$

Where $$\Delta \text{ Rank Score} = \text{Rank Score}_{i-1} - \text{Rank Score}_i \quad (12)$$

Color Likelihood$_{local}$—likelihood of pixel color belonging to ball color based on GMM model trained using ball blobs in the current track $$GBS = \text{Circularity} + \text{Color Likelihood}_{global} + \text{Eccentricity} \quad (13)$$

$$GBS_{avg} = \frac{\sum_{i=1}^{AoBT} GBS_i}{AoBT} \quad (14)$$

Where
$GBS_i$—Global Blob Score of ball blob when age of ball track equals 'i'
Where $$\text{Circularity} = \frac{\text{Perimeter of Blob}}{2\sqrt{\pi * (\text{Area of Blob})}}$$

Color Likelihood$_{global}$—likelihood of pixel color belonging to ball color based on GMM model trained using ball blobs obtained from different video streams under varying lighting conditions/tough scenarios $$\text{Eccentricity} = \sqrt{1 - b^2/a^2}$$

Where b, a—length of semi major and minor axes (interchangeably) of ellipse $$\sigma_{area}^2 = \frac{\sum_{i=1}^{AoBT-1}(x_{areai} - \mu_{area})^2}{AoBT - 1} \quad (15)$$

$$\mu_{area} = \frac{\sum_{i=1}^{AoBT-1} x_{areai}}{AoBT - 1} \quad (16)$$

Where
area—area of the blob in number of pixels.

The detection module then orders the set of algorithms according to their detect scores and selects the algorithm with the best (e.g. lowest) detect score as the base detection algorithm at the step 304. If the use of the base algorithm results in invisibility of the ball (e.g. it is unable to identify a ball blob with a level of confidence that satisfies a cost threshold of a cost function), the detection module will re-analyze the video using the next best ranked detection algorithm (e.g. having the next lowest detect score) and repeat this pattern if necessary until all the algorithms have been used to find the ball.

In some embodiments, if use of each of the set of algorithms still results in invisibility of the ball for one or more frames, the detection module trains a model (e.g. gaussian mixture model) based on the results (e.g. blobs/centroids of prior frames assigned to the declared ball track) of all of the algorithms and then uses the trained model to classify which blobs of each of the algorithms is the ball blob. The detection module then is able to merge the ball blobs from all of the algorithms for each frame (e.g. by using a boolean OR operator to combine the pixels of the ball blobs from each algorithm into one bigger blob). This merged/unionized blob is generally much more consistent in terms of its spatial characteristics (e.g. circularity/area).

In some embodiments, even if invisibility does not occur, in order to increase the consistency of detected blobs and corresponding blob scores (as described below), a plurality of the detection algorithms are able to be used serially on a set of input frames and if any of the resulting identified blob candidates from each of the algorithms overlap spatially, they are merged or unionized by the detection module for each frame (e.g. by using a boolean OR operator to combine the pixels of the ball blobs from each algorithm into one bigger blob). In some embodiments, the detection module implements this serial algorithm use when an average, or a best (e.g. highest) blob score falls below a threshold value.

Once the base algorithm has been selected, the detection module inputs the next frame from the camera module and performs a background subtraction and/or foreground extraction process on the frame to remove the background of the frame at the step 306. The detection module is then able to use the base algorithm to identify ball candidates (e.g. including filtering ball candidates and/or enhance/merge ball candidates) thereby returning one or more resulting ball candidates for that frame at the step 308.

If the ball track has been declared (e.g. as a result of the detection and tracking of previous) and use of the base detection algorithm to find blobs results in invisibility of the ball track for a frame (e.g. the base detection algorithm is unable to identify blobs for the ball track that satisfy the cost threshold), the detection module is able to instead use the next highest detection algorithm (from the order/ranking of algorithms created in steps 302 and 304) to look for candidates for the ball track at the step 306. In particular, once the ball track has been declared, each time use of the base detection algorithm or another of the detection algorithms results in invisibility of the ball track, the detection module is able to repeat the detection and association process using the next highest detection algorithm until ball track is visible for the frame (e.g. the detection algorithm finds a candidate blob for the ball track the meets the cost threshold) or all of the detection algorithms have been used for the frame. This serial algorithm use (based on the order) helps ensure that every attempt is made to avoid invisibility of the ball track for any of the frames.

Regardless of which detection algorithm is used, in some embodiments step 308 comprises the use of frame differencing as the base ball detection algorithm to identify ball candidates for each input frame. Specifically, because the intention is to detect a ball in motion, the detection module is able to use the algorithm to subtract or find a difference between multiple sequential frames to find the pixel locations which could potentially be representing locations of moving objects (e.g. the ball). Any pixel which gives absolute difference in value greater than a particular threshold set for that pixel is able to be identified as moving object pixel and then identified by the base algorithm along with adjacent moving pixels as ball candidate (e.g. blob).

Alternatively or in addition, in some embodiments step 308 comprises the use of triple frame differencing as the base ball detection algorithm. Specifically, because along with moving ball pixels many other pixels change their values in two consecutive frames, frame differencing is able to result in substantial noise (e.g. blobs of moving pixels that are not the ball in the form of player movement, clouds, sky, trees etc.). To combat this, triple frame differencing comprises frame differencing using 4 frames. Denoting the 4 frames in the order in which they occur at frames (n−3), (n−2), (n−1) and n, where n denotes the current frame number as $F_{n-3}$, $F_{n-2}$ $F_{n-1}$ and $F_n$. Hence the final output of frame differencing (FD) is given by:

$$FD=(F_n-F_{n-1})\&(F_n-F_{n-2})\&(F_n-F_{n-3}) \quad (17)$$

Where '&' denotes pixel-wise 'AND' operation. As a result, only pixels in a frame that show motion between not only the frame and the previous frame, but the frame and each of the three previous frames are identified as moving object pixels and subject to being identified as candidate blobs. Thus, noise in pixel movement caused by fluke or limited motion (and the blobs that would be derived therefrom) is limited by the detection module using the triple frame differencing.

In some embodiments, step 308 comprises the use of adaptive thresholding in addition to the frame differencing (e.g. before the frames are analyzed using frame differencing or otherwise by the base detection algorithm). Specifically, because almost every consecutive pixel in a frame would generally give a non-zero absolute value, a threshold value for each pixel is able to be needed so as to avoid noise in the form of an adaptive threshold. In order to determine the adaptive threshold values, the detection module determines the values of the pixels from a plurality of consecutive frames. For example, for an observed pixel P, the value of pixel P at time i is denoted as $p_i$ and adaptive threshold at P is denoted as $AT_p$. The threshold can be determined as:

$$AT_p=SD(p)+C; \quad (18)$$

Where, C denotes a constant value (e.g. a small integer) and SD denotes the standard deviation obtained from $p_i$'s obtained over the number of frames. In some embodiments, C is a constant which is derived by testing multiple streams, wherein the purpose of C is to take into account any noise which could have been part of the data used to calculate standard deviation. In particular, the above equation creates the beneficial result that pixels varying in values are assigned a greater threshold value than a reference (C), while pixels not varying in values would be assigned a lower threshold value than the same reference (C). These threshold values can then be used to filter out any pixels that do not meet their adaptive threshold eliminating noise from the frames before they are analyzed by the detection algorithm while also ensuring that ball detection is not disturbed while the noise is removed (e.g. over filtering).

In some embodiments step 308 comprises the use of blob size filtering (small and/or large) and/or location filtering (e.g. gating). Specifically, small blobs are able to be considered too small to be the ball (e.g. 1-2 pixels). As a result, the detection module is able to filter candidate blobs produced by the base algorithm by performing an open morphological operation on the blobs to remove the small blobs, wherein "open" is the dilation of the erosion of a set A by a structuring element B:

$$A \circ B = (A \ominus B) \oplus B; \quad (19)$$

where $\ominus$ and $\oplus$ denote erosion and dilation, respectively.

To remove blobs too large to be considered the ball (e.g. blobs >250 pixels), the detection module is able to use frame differencing computed using frames $F_n$ and $F_{n-3}$ which can be denoted as third Frame Difference ($FD_{3rd}$), where:

$$FD_{3rd}=(F_n-F_{n-3}) \quad (20)$$

In such embodiments, the module performs the morphological operation 'Dilate' on $FD_{3rd}$. Subsequently, the module is able to determine the contours or borders of the blob candidates produced by the detection algorithm and remove any blobs having contours with an area that is greater than a threshold value (e.g. blobs greater than 250), wherein the threshold value is based on the resolution of the frames and/or a predicted size of the ball.

To remove blobs considered to be in locations unlikely to be the ball or to reduce large quantities of candidate blobs, the detection module is able to use gating around a predicted value of a ball track for a current frame (described in detail below) and filter out all blobs that are not within the gated area. In particular, the height and/or width of the "gate" is able to be determined based on the velocity (e.g. vector direction and amplitude) of ball (as predicted based on characteristics of the blob identified as the ball in previous frames). As a result, blobs are filtered based on size and location, where the ball is not predicted to be present. The blobs which successfully pass through this filter will constitute "candidate blobs."

In some embodiments, the detection module adapts the detection algorithm based on the ball/blobs shrinking/growing size due to movement away-from/towards the sensors 103. Specifically, the detection module is able to determine a rate of change in the size of the blobs associated with a track over a number of frames and adjust the aggressiveness or conservativeness of one or more morphological operations used to identify the blobs by the detection algorithm. In other words, the detection algorithm is made more conservative if the blob is getting smaller (e.g. moving away from the sensor 103) and more aggressive if the blob is getting bigger (e.g. moving toward the sensor 103). In such embodiments, this is able to be done by tweaking the shape and/or size of the structuring element, wherein the structuring element is a matrix of size N×N used to perform morphological operations (e.g. erosion, dilation, or other morphological operations known the art) used to degrade the number of white pixels thus reducing noise (stray blobs). The extent to which that happens is dictated by the size/shape of the structuring element. As a result, when the size of the blob is small and/or getting smaller, it is harder to detect and the detection module uses a smaller structuring element in size. Alternatively, when size of the blob is big and/or getting larger, the detection module uses a large structuring element in size.

In some embodiments, step 308 comprises using multiple sensor 103 correspondence filtering. Specifically, in such embodiments a plurality of video sensors/cameras 103 are able to be used from a similar perspective view (e.g. capturing same side of a tennis court) to calculate the correspondences/commonalities from the blobs detected from one sensor 103 to the blobs detected from the other sensor 103 for the same frame (using relative orientation of both cameras). In such embodiments, the detection module is able to preserve only those blobs which map from the view of each of the sensors 103 and vice versa in both the views. Only Ball blob will have correspondences established across both views. Even if there are noisy blobs after filtering, there will be considerable reduction in the number of blobs thereby minimizing complexity.

In some embodiments, step 308 comprises the use of GMM models tuned using expectation maximization (EM). Specifically, the GMM models the spatial (color based) similarity of blobs previously associated with the track (as described below). The EM classifier is taught using features generated from pixels of blobs from previous frames that were associated with a track (positive class) and same number of randomly picked negative class samples from stray tracks (e.g. tracks or blobs that were filtered out). The EM classifier is able to use one or more color values (e.g. red, green and blue (RGB) values, YUV values, or other color space values) of the pixels of the good/selected or bad/filtered blobs to create the GMM model to classify among positive blob (e.g. ball) and negative blob (non-ball) classes. Subsequently, detection module is able to use the GMM model to filter blobs in subsequent frames by checking their likelihood to being a ball (e.g. a part of 'Blob Score'). In some embodiments, the characteristics of the good or bad blobs used to create the classes comprise higher order moments of blobs, which are used to calculate contour/border descriptors for blobs (e.g. which can indicate blob shape or inherent properties). Since the blobs are devoid of features, new features are able to be generated for the model using the contour and relationship between x and y values. In some embodiments, this is done only for blobs in the ball track. In some embodiments, the GMM model is able to be used by the detection module to remove or filter out blobs based on GMM models when ball is not in camera view (as indicated by a top-level state machine notifies a camera 103 whether it has ball in its view or not). This leads to drastic reduction in 'noisy' blobs from the system.

In some embodiments, the blob score determination comprises determining a quality of the candidate blobs based on a score obtained using pre-trained models (such as EM described above); a score adaptively obtained using few frames ball data (after ball is declared convincingly); the structural features of the blobs (circularity/shape/moment based features) and/or the spatial features of the blobs (Variance of color/Hue/Gray).

In some embodiments, by default or if the normal operation of the base algorithm is unable to identify enough or quality blob candidates, step 308 is able to comprises the use of Multi-Channel Detection. Specifically, multi-channel detection comprises performing the default operations described above (e.g. frame differencing, etc.) except using two channels, such as Y and U, since these channels provide good detection of the ball or blob candidates in complementing scenarios. First, the detection module performs a morphological 'Dilate' operation of $FD_Y$ and $FD_U$, where $FD_Y$ refers to the standard operation of the base algorithm (e.g. frame differencing) applied on Y-channel frames and $FD_U$ refers to the standard operation of the base algorithm (e.g. frame differencing) applied on U-channel frames. Then, the module is able to merge the output of both $FD_Y$ and $FD_U$ by using pixel-wise 'OR' operation as follows:

$$FD_{YU} = FD_Y | FD_U \qquad (21)$$

The output $FD_{YU}$ is then 'Opened' using the morphology 'Open' operation which results in the final detection output. As a result, candidates blobs that are only identifiable in one of the channels (e.g. Y, U, etc.) are able to still be identified by the detection module using the base detection algorithm.

Similarly, by default or if the normal operation of the base algorithm is unable to identify enough or quality blob candidates, step 308 is able to comprises the use of exposure compensation. Specifically, the exposure compensation comprises altering exposure and/or brightness levels for some or all of the frames and then processing the frames with the detection algorithm at each of the one or more different exposure and/or brightness levels. If the exposure is decreased (in case of overly exposed regions where ball exists) or the brightness is increased (in case of very gloomy and dark regions where ball exists), it can increase the chance of detecting the ball. Then, the detection module is able to remove or filter out any of the pixels that are not common pixels of the ball candidates identified for each of the levels (e.g. by using pixel-wise 'AND' operation). As a result, noise caused by dark or over exposed regions is able to be mitigated while still maintaining fidelity by only keeping common blobs to each of the levels.

In some embodiments, in order to more accurately filter the background from the foreground at step 306, the detection module is able to use adaptive threshold setting for the base detection algorithm in order to adapt to different regions of the background. Specifically, it is able to use a different threshold (for determining if the pixel is a part of the background or the foreground) for every pixel of the background depending on the nature of variance of the pixel value (e.g. the degree in change in pixel values). The calculation of the threshold is able to be performed before the run of the algorithm. It is based on the principle that lesser the variation in pixels, lesser the threshold value and vice-versa.

Tracking

Upon completion of step 308, the detection module will have identified one or more blobs within the subject frame that are candidates for being the actual ball (e.g. candidate blobs). These candidate blobs are then provided to the tracking module for producing tracks based on the candidate blobs and eventually declaring a ball track from the tracks for that frame. Specifically, at the step 310 the tracking module determines if there are any existing tracks. If there are no existing tracks from previous iterations of the system (as would be the initial case, or possibly after an event such as a bounce, net hit or racquet hit), the tracking module moves to step 312 to create tracks from the unassigned candidates (e.g. which would be all of the candidates at the outset). In some embodiments, the tracking module only creates tracks for the unassigned candidate blobs that have a global blob score that is better than a global blob score threshold value. Because there are no tracks initially, there would be no local blob score, so only the global blob score is able to be used to compare to the threshold.

To create the tracks at the step 312, the tracking module determines the centroid of each of unassigned blob candidates and identifies the location of that centroid as part of a new track, wherein the blob having that centroid is associated with that track. In some embodiments, the tracking module creates tracks from all of the unassigned blobs for that frame. Alternatively, the tracking module is able to determine and/or reference the blob score for each of the unassigned blobs and only create tracks for the unassigned candidates whose blob score is above a threshold value. In some embodiments, if the tracking module has already declared one of the existing tracks to be the ball track, the tracking module is able to refrain from creating any new tracks even if there are still unassigned blobs. Specifically, this feature is able to avoid generating competitor ball tracks or "stealer" tracks.

If there are existing tracks from previous iterations of the system, the tracking module moves to step 314 where it uses a prediction function (e.g. Kalman Filter (KF)) to predict the position that a track will be in the current frame based on the positions of the track in the previous frames (e.g. the location of centroids of blobs that were assigned to the track in the previous frames). As a result, the predication function generates a new track position for the current frame for each of the existing tracks which can then be compared to the blob candidates in that frame to determine which blobs best match the predicted locations (e.g. which blobs best go with which tracks).

In some embodiments, the new track locations are predicted using a Kalman filter. The tracks exhibit consistently reliable motion features (e.g. track angle, or velocity) if they are prevented from being assigned noisy centroids/blobs and any sudden change in direction of ball is appropriately accounted for. Usually a ball changes direction of its motion only upon certain events (e.g. bounce, racket hit, net hit). The data (e.g. prior centroids associated with the track) upon which the Kalman filter representing the motion of the ball bases its predictions is able to be reset at occurrence of one of these events in order to not propagate effect of direction change into parameters of motion represented by the KF. Re-initialization of the Kalman filter is desirable because the quality of the prediction of the filter increases with the quantity of the prior frame data and the reset means that the prior data relating to the track before the event is no longer useful for the new trajectory.

In some embodiments, the tracking module switches between prediction functions based on the occurrence of events (e.g. sudden change of direction events such as bounces, racquet hits, net hits, etc.) and/or invisibility of the ball/blobs for a period such that certain prediction functions are preferred over others. For example, if a Kalman filter is used as the prediction function by default, the tracking module is able to switch to a different prediction function (e.g. tracklet based prediction) when events or invisibility causes the Kalman filter to struggle due to the lack of relevant prior frame location data (e.g. because the data before the event is no longer as predictive of the motion of the blobs after the event). Thus, before an event has occurred or after a predetermined period/number of frames since an event has occurred, the tracking module uses the KF based tracker. Then, after the occurrence of an event and lasting for a period of at least the predetermined number of frames, the module uses the tracklet based method (using straightness criteria). Then after the predetermined period/number of frames has passed, the module is able to switch back to the Kalman filter.

In some embodiments, the tracking module is able to use "stitched" views obtained from multiple video sensors 103 to continue tracking of blobs/tracks from one sensor 103 to another. Specifically, because each of the sensors 103 provides a different view/perspective, the tracking module is able to extrapolate the trajectory of ball from one camera to the other. This can be done by predicting the location of ball when it enters from one sensor 103 to another 103 based on the relative locations of the sensors 103 to each other and the prior blob/track trajectory.

After the new predicted locations of each of the tracks are generated by the prediction function, the tracking module determines the rank score for each of the existing tracks and orders the tracks according to their rank scores with the better (e.g. lower) scoring tracks having a higher priority/ higher spot in the order at the step 316. In some embodiments, the tracking module refrains from determining the rank score for a track until the track has been alive for a predetermined number of frames and one or more blobs have been associated with the track. In some embodiments, the rank score is determined as follows:

During the Toss of the Ball (Serve)

$$\text{Rank Score} = \log(\sigma_{ta}^2 * \sigma_{accy}^2) + \alpha \quad (22)$$

Where
$\sigma_{ta}^2$—variance of track angle values from frame 1 to frame N
$\sigma_{accy}^2$—variance of acceleration in y direction values
$\alpha$—penalty factor for toss motion $$\sigma_{ta}^2 = \frac{\sum_{i=1}^{N}(x_{tai} - \mu_{ta})^2}{N} \quad (23)$$

Where
$\sigma_{ta}^2$—variance of track angle values from frame 1 to frame N
$x_{tai}$—value of track angle at frame i
$\mu_{ta}$—mean value of all track angle values from frame 1 to frame N
N—total number of track angle values $$\mu_{ta} = \frac{\sum_{i=1}^{N} x_{tai}}{N} \quad (24)$$

$$x_{tai} = \tan^{-1}\left(\frac{\Delta y_i}{\Delta x_i}\right) \quad (25)$$

Where
$\Delta y_i$—displacement in y direction between frame i-1 and frame i
$\Delta x_i$—displacement in x direction between frame i-1 and frame i $$\sigma_{accy}^2 = \frac{\sum_{i=1}^{N}(x_{accyi} - \mu_{accy})^2}{N} \quad (26)$$

Where
$\sigma_{accy}^2$—variance of acceleration in y direction values
$x_{accyi}$—value of acceleration in y direction at frame i
$\mu_{accy}$—mean value of all values of acceleration y from frame 1 to frame N $$\mu_{accy} = \frac{\sum_{i=1}^{N} x_{accyi}}{N} \quad (27)$$

$$x_{accyi} = \ddot{x}_{yi} \quad (28)$$

Where $$\ddot{x}_i = \frac{d^2 x_{yi}}{dt^2}$$

Where
$\ddot{x}_i$—second order differential of $x_{yi}$ with respect to time (in terms of frame)
$x_{yi}$—value of y-coordinate of blob centroid $$\alpha_i = \begin{cases} \alpha_{i-1} * \pi_i \\ -\Omega_i \\ , i > 0 \\ 1, i = 0 \end{cases} \quad (29)$$

where $$\pi_i = \begin{cases} \pi_{i-1} + 1, y_{i-1} * y_i < 0 \\ 0, y_{i-1} * y_i \geq 0 \\ 0, i = 0 \end{cases} \quad (30)$$

$$\Omega_i = \begin{cases} 0, y_{i-1} * y_i < 0 \\ \Omega_{i-1} + 1, y_{i-1} * y_i \geq 0 \\ 0, i = 0 \end{cases} \quad (31)$$

Penalty factor takes care of stray competing tracks before other Rank Score components of ball track stabilize while promoting ball track motion; log has been taken to bring all components to same scale
During the Projectile of the ball (rally)

$$\text{RankScore} = \eta * \beta + \log(\sigma_{accy}^2 * \sigma_{tas}^2) \quad (32)$$

Where
$\eta$—root mean square of the error obtained using parabola fit
$\beta$—penalty factor for projectile motion
where $$\eta_i = \frac{\sqrt{\sum_{j=1}^{N}(y_j - f(x_j))^2}}{N} \quad (33)$$

$$f(x_j) = a_0 + a_1 x_j + a_2 x_j^2 \quad (34)$$

Where $a_0$, $a_1$ and $a_2$ are given by $$\vec{a} = (X^T X)^{-1} X^T \vec{y} \quad (35)$$

where $$\vec{a} = \begin{matrix} a_0 \\ a_1 \\ a_2 \end{matrix} \quad (36)$$

$$\vec{y} = \begin{matrix} y_1 \\ \vdots \\ y_N \end{matrix} \quad (37)$$

$$X = \begin{matrix} 1 & x_1 & x_1^2 \\ \vdots & \vdots & \vdots \\ 1 & x_N & x_N^2 \end{matrix} \quad (38)$$

$$\beta_i = \begin{cases} \beta_{i-1} * \lambda_i \\ -v_i \\ , i > 0 \\ 1, i = 0 \end{cases} \quad (39)$$

where $$\lambda_i = \begin{cases} \lambda_{i-1} + 1, x_{i-1} * x_i < 0 \\ 0, x_{i-1} * x_i \geq 0 \\ 0, i = 0 \end{cases} \quad (40)$$

$$v_i = \begin{cases} 0, x_{i-1} * x_i < 0 \\ v_{i-1} + 1, x_{i-1} * x_i \geq 0 \\ 0, i = 0 \end{cases} \quad (41)$$

$$\sigma_{accy}^2 = \frac{\sum_{i=1}^{N}(x_{accyi} - \mu_{accy})^2}{N} \quad (42)$$

$$\mu_{accy} = \frac{\sum_{i=1}^{N} x_{accyi}}{N} \quad (43)$$

$$x_{accyi} = \ddot{x}_i \quad (44)$$

$$\sigma_{tas}^2 = \frac{\sum_{i=1}^{N}(x_{tasi} - \mu_{tas})^2}{N} \quad (45)$$

$$\mu_{tas} = \frac{\sum_{i=1}^{N} x_{tasi}}{N} \quad (46)$$

-continued $$x_{tasi} = \tan^{-1}\left(\frac{\Delta y_i}{\Delta x_i}\right) \quad (47)$$

Where $\sigma_{tas}^2$—variance of slope of track angle values from frame 1 to frame N $x_{tasi}$—value of slope of track angle at frame i $\mu_{tas}$—mean value of all slope of track angle values from frame 1 to frame N $$RS_{avg} = \frac{\sum_{i=1}^{AoBT} RS_i}{AoBT} \quad (48)$$

where $RS_{avg}$—Average Rank Score $RS_i$—Rank Score of a track when age is i

Penalty factor takes care of stray competing tracks before other Rank Score components of ball track stabilize; log has been taken to bring all components to same scale; RMSE is normalized since RMSE keeps increasing as the track grows since any curve fit will not perfectly fit all the points (due to skewness).

At the step 318, the tracking module determines the blob score for each of candidate blobs returned by the detection module. Specifically, the tracking module is able to determine a blob score for each blob with respect to each track (e.g. if 3 blob and 3 tracks, then there will be 9 blob scores with each blob having three scores). Similarly to the tracks with the rank score, the detection module then orders the blobs according to their blob scores with the better scoring blobs having a higher priority/higher spot in the order. In some embodiments, the blob score comprises a local blob score (LBS) and a global blob score (GBS) that together form the blob score. In some embodiments, a blob score threshold is used where any of the candidate blobs having a score that is lower than the threshold are filtered out such that only the remaining candidate blobs are ordered into the priority ranking according to their blob scores. In some embodiments, the blob score is based on one or more of a score obtained using models (such as EM discussed above), a score adaptively obtained using few frames ball data (after ball is declared convincingly), structural features of the blob (circularity/shape/moment based features), and/or spatial features of the blob (variance of color/Hue/Gray). For example, in some embodiments the blob score is determined as follows:

$LBS_i$—Local Blob Score of ball blob when age of ball track equals 'i' given by $$LBS_i = \Delta \text{ Rank Score} + \text{Color Likelihood}_{local} \quad (49)$$

Where $$\Delta \text{ Rank Score} = \text{Rank Score}_{i-1} - \text{Rank Score}_i \quad (50)$$

Color Likelihood$_{global}$—likelihood of pixel color belonging to ball color based on GMM model trained using ball blobs in the current track $$GBS = \text{Circularity} + \text{Color Likelihood}_{global} + \text{Eccentricity} \quad (51)$$

Where $$\text{Circularity} = \frac{\text{Perimeter of Blob}}{2\sqrt{\pi * (\text{Area of Blob})}}$$

Color Likelihood$_{global}$—likelihood of pixel color belonging to ball color based on GMM model trained using ball blobs obtained from different video streams under varying lighting conditions/tough scenarios $$\text{Eccentricity} = \sqrt{1 - b^2/a^2}$$

Where b, a—length of semi major and minor axes (interchangeably) of ellipse

Where

Blob Score BS=GBS+LBS.

$$BS_{avg} = \frac{\sum_{i=1}^{AoBT} BS_i}{AoBT} \quad (52)$$

where $BS_{avg}$—Average Blob Score

In some embodiments, the tracking modules only uses the characteristics of localized regions (e.g. super linear iterative clustering (SLIC)) within blobs to contribute to the blob score for that blob rather than the entire blob. Specifically, parameters such as variance are able to be calculated for all such localized regions within the ball blob, wherein variance scores are able to be subsequently summed up and normalized. Due to differential lighting across the spatial region of ball, different parts of ball are characterized by different features. Thus, for reliable 'blob score' calculation, the tracking module is able to independently treat homogenous parts of the blob to determine sub-blob scores and then all of the sub-blob scores of the homogenous parts are congregated subsequently (e.g. by finding average of the sub-blob scores obtained for the small localized regions of blob).

If a base cost function has not been selected and/or an order of non-base cost functions have not yet been generated, the tracking module selects a cost function from a set of different cost functions (e.g. Mahalanobis, straightness-quotient, parabolic-quotient, euclidean, rank score, color likelihood and/or circularity and/or eccentricity) as a base cost function and orders the remaining cost functions (the base function and the order for valuating which candidate blobs are best associated with which tracks) at the step 319. Every cost function outputs the cost of association with respect to every blob to a particular track. Different cost functions are designed based on different criteria. For every cost function there needs to be a normalized score (e.g. cost score) which can be compared with other normalized scores for other cost functions. The cost score is calculated using sample ball track data derived out of ball detection and tracking which remains the same to compute scores for all cost functions. In some embodiments, the cost function with the best cost score is selected as the base cost function. In some embodiments, the remaining cost functions are then sorted/ranked based on their cost scores similar to the ranking of the detection algorithms using detect score. In other words, just like the selection of the base detection algorithm from the set of detection algorithms, a base cost function is selected and multiple cost functions are sorted/ranked by the tracking module based on a cost score that indicates how they are performing. This base cost function is then used by the tracking module to measure cost of association until a ball track has been declared. Alternatively, the base cost function and/or the initial order of the cost functions is able to be predetermined.

In some embodiments, the cost score is determined as follows:

Let the cost function for which Cost Score needs to be evaluated be $y=f(x)$

Where
y—cost of association
x—data used to calculate the cost.

This data is based on different cost functions. For example, distance based cost functions will take centroid as input whereas color based cost functions will take color vectors corresponding to the blob pixels as input.

$$CostScore_j = \frac{\sum_{i=1}^{AoBT} f_j(x_i)}{AoBT * NF_j}$$

Where
$CostScore_j$—Cost score of cost function j
$f(x_i)$—Cost of a blob with respect to track at frame i
$NF_j$—Normalization constant corresponding to cost function j given by $NF_j=\max(\{f_j(x):x=1,\ldots,AoBT\})$ The set of cost functions is able to comprise one or more of motion based functions (straight line and/or mahalanobis distance and/or euclidean distance and/or rank score) and/or spatial based functions (Color likelihood and/or circularity and/or eccentricity). In some embodiments, the Mahalanobis distance cost function is used as the initial/default cost function.

In some embodiments, the tracking module switches from the selected base cost function to a different one of the set of cost functions based on a detection of a prevailing condition of the candidate blobs and relative spatial crowding of the blobs. For example, in some embodiments the indicated cost functions are switched to (if not already in use) when the indicated criteria is met:
   Use of Euclidean cost function during invisibility/crowding around player. Decision for applying Euclidean cost is done using surge in number of centroid candidates for association;
   Use of Straightness after racket hit during Serve. This condition is detected by the event detection module;
   Use of Straightness during invisibility over short period of time; Use goodness of fit (GoF) of Projectile Curve during invisibility over longer period of time;
   Use of Euclidean when player is about to hit ball as indicated by a surge in number of centroid/blob candidates for association and/or more than one cost friendly blob candidate competing for association); and
   Use of Rank Score based cost after ball track declared, which is the change in rank score value if the blob is assigned to the track.
As a result, the tracking module is able to cater the cost function to the current circumstances of the blobs/tracks.

Once the current cost function (e.g. base cost function) has been selected, the tracking module computes the cost of assigning each of the remaining candidate blobs to each of the tracks at the step 320. The tracking module is then able to assign one of the candidate blobs to each of the tracks if the cost of the association (as determined by the calculated cost of assigning) satisfies (e.g. is below) a cost threshold value (e.g. cost of non-association (CostNA)) at the step 321. In other words, the module determines if the candidate blob with the best blob score (e.g. highest blob in the order/rank determined in step 318) is able to be assigned to the track with the best (e.g. lowest) rank score (e.g. the highest track in the order determined in step 316) based on the cost of that assignment.

If the cost is below the cost threshold value, the blob is assigned to the track (e.g. the centroid of the blob will be considered a part of the track and the blob will be considered related to the other blobs assigned to the track from previous frames). If the cost is not below the threshold value, the tracking module does the same thing with next blob in the blob score order and the same track until one of the blobs has been assigned to the track or all of the blobs in the order have been evaluated. If no blobs have cost less than the threshold for that track, then the track is invisible for that frame with respect to the detection algorithm used to generate those blobs and the cost function used to measure the cost. The cost threshold is able to be different for each cost function and based on that cost function. Once a blob has been assigned to a track, the tracking module removes that blob from the order (so it cannot be assigned to a different track at the same time), selects the next track in the order and starts at the top of the blob order determining if any of the blobs are able to be assigned to this track. This pattern is repeated until all of the tracks have been assigned blobs if there are blobs that satisfy the cost threshold value for each track.

The tracking module then determines if a declared ball track exists (e.g. a track that was identified as the ball track based on previous frames) at the step 322. If not the method proceeds to step 326 described below. If a declared ball track does exist, at the step 323 the tracking module determines if ball candidate was found in steps 320 and 321 that satisfied the cost threshold for the selected cost function (e.g. base cost function) for the declared ball track. If so, the method again proceeds to step 326. If not, the tracking module checks if there are more cost functions in the order that have not been used for the current frame at the step 324. If not, the method proceeds to step 326. If so, the tracking module repeats steps 320 and 321 using the next best cost function from the order and its associated cost threshold in order to try an identify a candidate that is able to be associated with the declared ball track at the step 325. As a result, when a ball track has been declared, the tracking module attempts each of the different cost functions in order if necessary to find a suitable ball candidate/blob to associate with the ball track (and therefore prevent the ball track from being invisible for that frame for that detection algorithm).

To take an example, let us denote the frames as $F_{(n-3)}$, $F_{(n-2)}$, $F_{(n-1)}$ and $F_n$ and the list of candidate blobs corresponding to time (n–3), (n–2), (n–1) and n as $L_{(n-3)}$, $L_{(n-2)}$, $L_{(n-1)}$ and $L_n$. Further, let us denote the list of existing tracks corresponding to time (n–3), (n–2), (n–1) and n as $T_{(n-3)}$, $T_{(n-2)}$, $T_{(n-1)}$ and $T_n$. The goal data association is to assign the most confident candidate blob (in terms of cost) to a track. Hence, each one of $T_i$'s will be assigned to one out of $L_i$'s which has the best cost of association only if the cost of association satisfies the cost threshold.

Let's say the quantity of blobs of $L_{(n-3)}$, $L_{(n-2)}$, $L_{(n-1)}$ and Ln are 3, 3, 2 and 1 (with the single blob in the last list being the ball blob) and assume that ball blob is present at times (n−3), (n−2) and (n−1), denoting the centroids in $L_i$ as $C_1$, $C_2$, and so on. If the sizes of $T_{(n-3)}$, $T_{(n-2)}$, $T_{(n-1)}$ and $T_n$ are 0, 3, 3 and 3, it would mean that track corresponding to ball originated at time (n−3) and 2 stray tracks (corresponding to the two other blobs that turn out not to be the ball) continue to stay alive at time n assuming they are not deleted (since time passed is small).

With this in mind, at time (n−2), we have 3 tracks which have taken birth at time (n−3) which need to be associated. First the tracks are sorted based on 'Rank Score' and the blobs are sorted based on 'Blob Score'. Now for track $T_1$ (track with best Rank Score and therefore at the top of the ordered track list), the tracking module calculates the cost for every blob centroid in $L_{(n-2)}$ and traverses the list of centroids sorted in order of Blob Score. Let us say that first blob sorted according to blob score is the ball. If cost of association of $T_1$ to $C_i$ satisfies the threshold value, then $T_1$ is associated to $C_i$. Let us take $T_1$ to be ball track for sake of simplicity. Hence, the association is assumed to succeed provided cost function selected for this purpose has performed well. Similarly, the two other stray tracks are associated with the remaining blobs by selecting the next best (e.g. highest) track in the order for association first and then the last track in the order last. Now at time (n−1), we only have 2 blobs and 3 tracks. Hence we will have 1 track (in this case a stray track) with no association (because no blobs from the order will be left to associate with it). As a result, that stray track is declared to be 'invisible'. Finally, the track with blob centroids continues to stay alive and gets associated with ball blob at time n, wherein the other two tracks are declared invisible at time n. As a result, at each iteration the blob and rank scores (along with the threshold value) are used by the tracking module to associate blobs with tracks in an effort to ensure that the blob that represents the actual ball (and its associated track) remains alive while the other blobs/tracks are removed until it can be definitely identified as the ball/ball track.

In some embodiments, if predicted value of a track (e.g. as predicted by the prediction function at step 314) lies within a blob, the tracking module assigns that blob to the track even if one or more of the other candidate blobs have a lower cost of association with that track (as defined by the current cost function). In some embodiments, the tracking module dynamically adjusts the detection the data association parameters (such as cost threshold value (CostNA)) based on cost of last associated centroid/blob. In particular, in such embodiments, the CostNA value is adjusted after every association (e.g. after each blob is assigned to a track) based on the cost of the previous association (as determined by the cost function). For example, the cost adjustment is able to be:

$$\text{CostNA} = K * \text{previousWinningCost}; \quad (53)$$

Where K is an empirically derived constant with value (e.g. 1.3)

In some embodiments, the value K is able to be based on the quality of associations as indicated by a Kalman Gain. For example, incorrect associations can be detected, when variance of Kalman Gain exceeds a threshold. As a result, if the quality of associations is high, the tracking module is able to increase the value of K (thereby increasing the rate at which the cost threshold value grows after each association) and making each subsequent association easier to find (e.g. thereby reducing the rate of track invisibility). Similarly, if the quality of associations is low, the tracking module is able to decrease the value of K (thereby decreasing the rate at which the cost threshold value grows after each association) and making each subsequent association less easy to find (e.g. because it must have a cost less than the slower growing cost threshold value).

After candidate blobs have been associated with all of the tracks (if possible), the tracking module validates the assignment based on a multi-cost function approach at the step 326. Specifically, the tracking module verifies each of the associations by checking other costs with respect to the centroid/blob associated. For example, after blob association is done using a first cost function (e.g. mahalanobis cost), a second cost function (e.g. Euclidean cost) is computed as well. If the second cost function cost is high and not acceptable (e.g. greater than the cost threshold) based on the history of the track with which the blob is being associated (using prior blob position/velocity/acceleration data associated from the blobs associated with the track), steps 322 and 324 are re-performed using the second cost function. This helps in dealing with unpredictable external noise in the system 11 which sometimes leads to wrong association using a particular cost function. Alternatively, step 326 is able to be omitted.

The tracking module then calculates new rank scores for each of the tracks that were assigned new blobs and updates the prediction filter used in step 314 with the new associations (e.g. the new data about each of the tracks now that the associated blobs are considered a part of the tracks) such that the prediction filter has new data upon which to base predictions in the next frame at the step 328. If one or more of the tracks have a new rank score that is worse (e.g. higher) than a rank score deletion threshold value, the tracking module is able to delete the tracks (e.g. as not likely being the ball track) at the step 330.

At the same time, the tracking module is able to identify a number of the tracks as ball track candidates at the step 332. For example, the tracking module is able to filter out any tracks having: a visibility percentage that is less than a visibility threshold value (e.g. 85%), wherein visibility refers to the percentage of frames where a blob was found that was able to be associated with that track (e.g. met the cost threshold); an age (e.g. the number of frames the track has been alive for) that is less than a frame threshold (e.g. less than 6-10 frames old); and/or a number of consecutive frames of invisibility greater than a consecutive invisibility threshold (e.g. 0 frames).

Then, from the remaining candidate tracks (e.g. the candidate tracks that satisfy the filter requirements above), the tracking module sorts the tracks based on their new rank score, selects the track with the best (e.g. lowest) rank score, and increments a counter each time that track is the selected track. Finally, at the step 334, if the value of the counter for the selected track is greater than or equal to a counter threshold value (e.g. 2 frames), the tracking module identifies/declares the track as the ball track. If the value of the counter for the selected track is less than the counter threshold value, the tracking module refrains from identifying/declaring a ball track for that frame. After a ball track has been declared, as described above, other non-base detection algorithms are able to be used in the same sorted order as determined in steps 302 and 304 to find the ball in case of invisibility and/or a bad association.

In some embodiments, if the event detection module indicates that the frame is from a "toss" event, the tracking module is able to additionally 1) determine if the variance of x-coordinates of all centroids in track is less than a x-variance threshold (e.g. 20 pixels) and the variance of y-coordinates of all centroids in track is greater than a y-variance threshold (e.g. 50 pixels) and 2) check if a number of times the sign of the velocity of the track in the y direction is less than or equal to a sign change threshold (e.g. 1). In such embodiments, even if the track would have been declared the ball track under the normal requirements, the tracking module refrains from declaring the track as the ball track unless both of these two additional requirements are also satisfied.

In some embodiments, steps 332 and 334 further comprise the tracking module determining a track score for each of the ball track candidates and even if the track would have been declared the ball track under the normal requirements, the tracking module refrains from declaring the track as the ball track unless it has a track score above a track score threshold value.

In particular, the track score is able to be based on spatial features (using confidence obtained from pre-defined models/general features). For example, in some embodiments the track score is able to be calculated as follows:

During the Projectile of the Ball (Rally)

$$\text{Track Score} = c_1 * \left( \frac{c_2}{(\text{abs}(netdx) + \text{abs}(netdy))} \right) + c_3 * \sigma_{tas}^2 + c_4 * \sigma_{area}^2 \quad (54)$$

where,
netdx—net displacement from frame 1 to frame N in x-direction
netdy—net displacement from frame 1 to frame N in y-direction
$\sigma_{tas}^2$—variance of slope of track angle values from frame 1 to frame N
$\sigma_{area}^2$—variance of area values of triangles formed by using 3 consecutive centroid locations $$netdx = \sum_{i=2}^{N} (x_i - x_{i-1}) \quad (55)$$

$$netdy = \sum_{i=2}^{N} (y_i - y_{i-1}) \quad (56)$$

$$\sigma_{tas}^2 = \frac{\sum_{i=1}^{N} (x_{tasi} - \mu_{ta})^2}{N} \quad (57)$$

$$\mu_{tas} = \frac{\sum_{i=1}^{N} x_{tasi}}{N} \quad (58)$$

$$\sigma_{area}^2 = \frac{\sum_{i=1}^{N} (x_{areai} - \mu_{area})^2}{N} \quad (59)$$

$$\mu_{area} = \frac{\sum_{i=1}^{N} x_{areai}}{N} \quad (60)$$

During the Toss of the Ball (Serve)

$$\text{Track Score} = c_1 * \left( \frac{c_2 * \text{abs}(netdx)}{(\text{abs}(netdy))} \right) + c_3 * \sigma_{ta}^2 + c_4 * \sigma_{area}^2$$

where,
netdx—net displacement from frame 1 to frame N in x-direction
netdy—net displacement from frame 1 to frame N in y-direction
$\sigma_{ta}^2$—variance of track angle values from frame 1 to frame N
$\sigma_{area}^2$—variance of area values of triangles formed by using 3 consecutive centroid locations.

Next, at the step 336, the tracking module determines if a ball track still exists that has been declared (either during that frame or a previous frame). If no declared ball track currently exists, the method moves to step 338. At step 338, the tracking module checks if any unassigned blob candidates are remaining. If not, the next frame is input and the method returns to step 306. If so, tracking module returns to step 312 and generates tracks using the unassigned blob candidates before inputting the next frame and returning to step 306. In some embodiments, if a ball track has already been declared based on previous frames, steps 332 and 334 are able to be omitted and the method jumps to step 336.

If a ball track does exist at step 336, the method moves to step 340 where the tracking module determines whether a track health score of that declared ball track satisfies a track health score threshold. Specifically, Track Health Score is a confidence value for the detection of the Ball Track. It represents the confidence with which it can be said that the track currently declared as the ball track is indeed the ball track. Track Health Score is likely to be used in multi-visual sensors 103 scenario to tackle any possible case of falsely detecting the ball. In particular, in some embodiments in the event when the frames detected by different sensors 103 indicate two or more different tracks (which do not have any correspondence when transformed from one sensor 103 view to the other) as representing the ball track, the tracking module uses calculates a track health score for each of the identified ball tracks from the different sensors 103 and the track with the best track health score will be considered the actual ball track (instead of the ball tracks identified by the other sensors 103). As a result, the track health score provides the advantage of avoiding false event detection and prevent incorrect scoring. In some embodiments, the track health score is determined as follows:

$$\text{Track Health Score} = BS_{avg} * e^{-RS_{avg}}$$

Where
$BS_{avg}$—average blob score
$RS_{avg}$—average rank score

If the track health score of the declared ball track meets the track health score threshold, the detection module and tracking module re-order the non-base detection algorithms and the non-base cost functions based on the ball track data at the step 342. In other words, once the ball track has been identified/declared (using the base detection algorithm and base cost function) and meets the track health score threshold, all the cost functions that were not selected as the base cost function and all of the detection algorithms that were not selected as the base detection algorithm are reordered based on their detect score or cost score using only the data related to blobs of the declared ball track (e.g. centroids, color data, blobs and/or other detect and cost score data as described herein). Alternatively, step 340 is able to be omitted and the method moves from step 338 to 342. For example, in some embodiments, step 340 is only performed where two or more sensors 103 with a fixed configuration known prior are viewing the ball at the same time.

After the cost functions and detection algorithms have been reordered in step 342 or if track health score of the declared ball track does not satisfy the track health score threshold at the step 340, the method moves to step 344 where the tracking module determines if the declared ball track is invisible for the current frame (e.g. the current detection algorithm did not find any candidate blobs that satisfied the cost threshold). If the declared ball track was not invisible for the frame, the method again moves to step 338. If the declared ball track was invisible for the frame for the current detection algorithm, the detection and tracking modules repeat steps 306 to 334 using the next best detection algorithm in the order (wherein the order may have been reordered at step 342). Then the tracking module determines if the declared ball track is still invisible for the frame at the step 348. If the declared ball track is no longer invisible, the method moves to step 338. If the declared ball track is still invisible, the tracking module determines if there are still more detection algorithms in the order that have not yet been tried for this frame at the step 350. If yes, the tracking module repeats steps 346 and 348 using the next best detection algorithm from the order. If no, the tracking module increments an invisibility counter for the ball track at the step 352. Then, at the step 354, if the invisibility counter exceeds an invisibility threshold value, the tracking module returns to step 342 and reorders the cost functions and detection algorithms based on some or all of the existing ball track data (as described above). If it does not exceed the threshold, the method moves to step 338 and continues as described above with respect to step 338. As a result, the method provides the advantage of dynamically adjusting the detection and tracking methods/functions/algorithms when the current conditions are creating invisibility for the ball track.

In some embodiments, in order to protect against the use of bad data, one or both of the detection module and the tracking module refrain from using data derived from frames where invisibility occurred (and/or a predetermined number of frames after the invisibility occurred) when calculating one or more of the scores (e.g. blob score, rank score, track score, track health score, detect score, ball track detect score) described herein for the track/ball that incurred the invisibility. Similarly, in some embodiments one or both of the detection module and the tracking module refrain from using data derived from frames where the change in the area of a blob from the previous frame exceeds a threshold value when calculating one or more of the scores (e.g. blob score, rank score, track score, track health score, detect score, ball track detect score) described herein for the track/ball that incurred the area change. This is because not all values generated as a result of building ball trajectory are of good quality. In particular, there are able to be corruptions in ball/blob track data because of which some of the scores proposed can show unexpected deflections. For example, upon the occurrence of events such as bounce/racket hit/net hit, rank score may not be calculated for all points but is valid before and after the event occurrence but not valid globally.

FIG. 4 illustrates a ball parameter display according to some embodiments. Specifically, once the ball track has been identified for one or more of the frames, the umpiring, scoring and statistics module is able to analyze the ball and/or ball track data and calculate one or more parameters about the ball and provide them on the application 106 on one or more of the devices 102 (and/or at a website run by the server 104) for a user to review. In particular, the umpiring, scoring and statistics module is able to determine the trajectory, size, spin and location of the ball (e.g. with respect to a tennis court) in order to calculate parameters such as those shown in FIG. 4. Alternatively, one or more additional parameters are able to be derived from the ball/track data.

Figure 5:
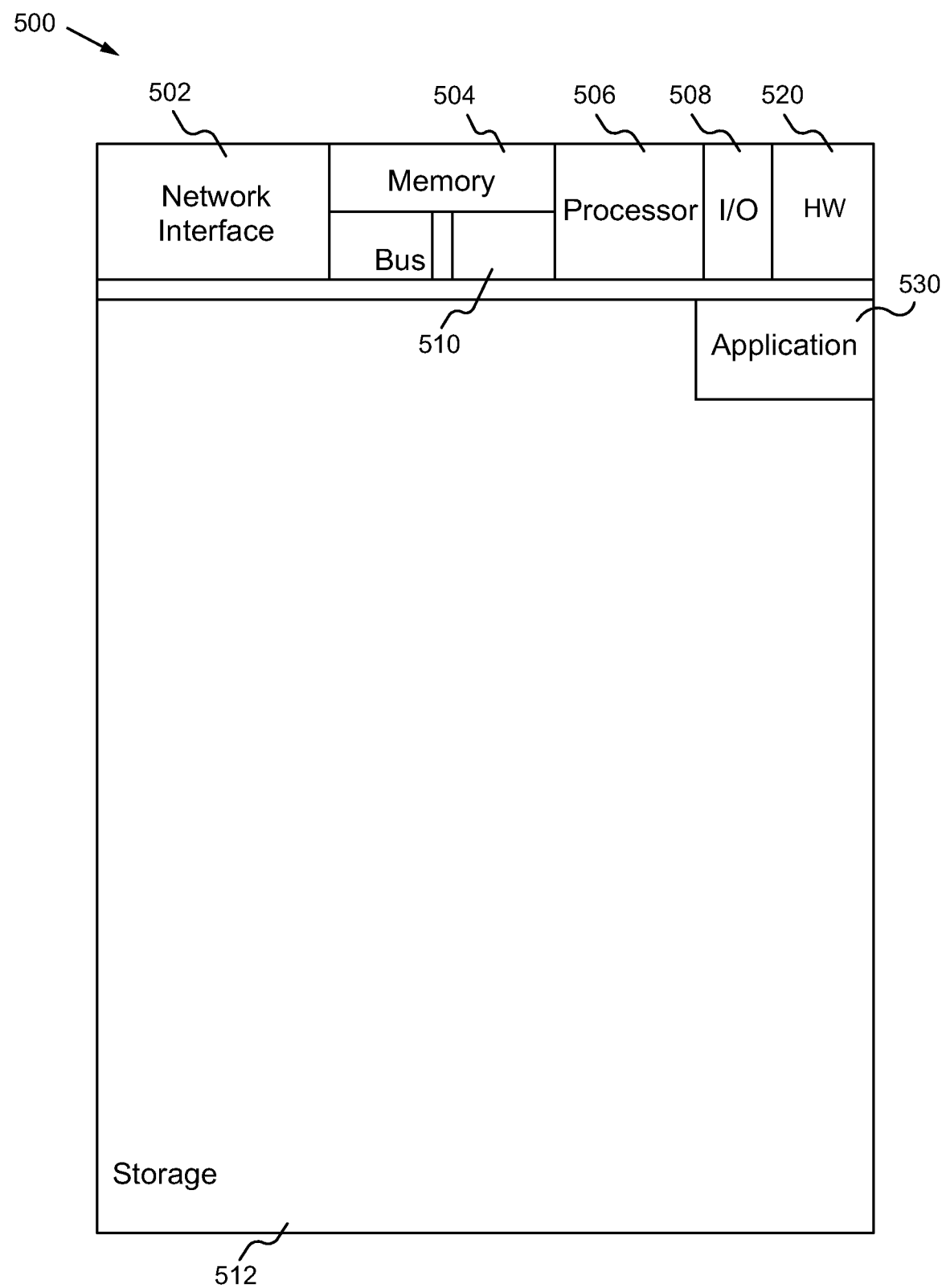
FIG. 5 illustrates a block diagram of an exemplary computing device configured to implement the system according to some embodiments.

FIG. 5 illustrates a block diagram of an exemplary computing device 500 configured to implement the system 100 according to some embodiments. In addition to the features described above, the computing devices 102 and/or servers 104 are able to be substantially similar to the device 500. In general, a hardware structure suitable for implementing the computing device 500 includes a network interface 502, a memory 504, a processor 506, I/O device(s) 508 (e.g. reader 105), a bus 510 and a storage device 512. Alternatively, one or more of the illustrated components are able to be removed or substituted for other components well known in the art. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. The application 106 or module(s) thereof are likely to be stored in the storage device 512 and memory 504 and processed as applications are typically processed. More or fewer components shown in FIG. 5 are able to be included in the computing device 500. In some embodiments, authentication system hardware 520 is included. Although the computing device 500 in FIG. 5 includes applications 530 and hardware 520 for the system, the system is able to be implemented on a computing device in hardware, firmware, software or any combination thereof.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. As described herein, "Detect Score"—Lower the better; "Rank Score"—Lower the better; "Track Score"-Lower the better; "Cost Score"—Lower the better; "Blob Score"—Higher the better; and "Track Health Score"—Higher the better. Alternatively, one or more of the scores are able to be altered such that the reverse is true (e.g. "Detect Score"—higher the better). Similarly, as described herein, in cases where lower score is better, sorting/ranking is done in ascending order and in cases where higher score is better, sorting/ranking is done in descending order. Alternatively, the reverse is able to be used.

What is claimed is:

1. A ball detection and tracking system, the system comprising:
    a plurality of visual detectors each having one or more light sensors for sensing a plurality of frames of images; and
    a mobile ball detection and tracking device coupled with the visual detectors for receiving the frames from the visual detection devices, the ball detection and tracking device having a processor and a non-transitory computer-readable memory storing a detection and tracking agent including:
- a detection module that ranks a plurality of blob detection algorithms based on a detection metric, selects a best ranked detection algorithm to be a base detection algorithm, and uses the base detection algorithm to identify one or more first candidate blobs within a first frame of the frames and one or more second candidate blobs within a second frame of the frames; and
- a tracking module that generates a track for each of the first candidate blobs including a predicted location of each of the tracks within the second frame, ranks each of the second candidate blobs based on a blob metric and each of the tracks based on a track metric, and assigns one of the second candidate blobs to a best ranked one of the tracks if the assignment satisfies a cost threshold as measured by a cost function:

wherein the cost threshold is dynamically adjusted each time one of the blobs is associated with one of the tracks based on a cost of associating the one of the blobs with the one of the tracks as measured by the cost function.

2. The system of claim 1, wherein the tracking module determines if any of the second candidate blobs satisfy the cost threshold for the best ranked one of the tracks, and of those that do satisfy the cost threshold, assigns the second blob having the best rank to the best ranked one of the tracks.

3. The system of claim 2, wherein, at each iteration, after excluding any of the second candidate blobs that have already been assigned and any of the tracks that have been assigned to, the tracking module iteratively:
- determines if any of the second candidate blobs satisfy the cost threshold for the best ranked one of the tracks; and
- of those that do satisfy the cost threshold, assigns the second blob having the best rank to the best ranked one of the tracks until all of the tracks have been assigned to.

4. The system of claim 1, wherein after using the base detection algorithm, the detection module:
- uses one or more other detection algorithms of the plurality of detection algorithms to identify one or more other first candidate blobs within a first frame of the frames and one or more other second candidate blobs within a second frame of the frames;
- classifies one of the second blobs as a ball blob, and for each of the other detection algorithms, classifies one of the other second blobs identified by the other detection algorithm as other ball blobs; and
- combines the characteristics of the ball blob and each of the other ball blobs to generate a unionized blob.

5. The system of claim 1, wherein the second frame has an initial exposure level, the detection module:
- adjusts the second frame to have a second exposure level and uses the base detection algorithm to identify one or more other second candidate blobs within the second frame as adjusted;
- classifies one of the second blobs as a ball blob and one of the other second blobs as another ball blob; and
- creates a unionized ball blob that only includes pixels that are common to both the ball blob and the other ball blob.

6. The system of claim 1, wherein the tracking module selects the cost function from a plurality of stored cost functions based on a cost score of each of the cost functions.

7. The system of claim 1, wherein the tracking module determines if the assigning of the one of the second candidate blobs to the best ranked one of the tracks satisfies a second cost threshold as measured by a second cost function and refrains from making the assignment if the assignment does not satisfy the second cost threshold.

8. The system of claim 1, wherein the tracking module refrains from generating a track for one or more of the first blobs if the blobs do not satisfy a blob metric threshold as measured by the blob metric.

9. The system of claim 1, wherein the tracking module determines whether one of the tracks is a ball track based on one or more of a group consisting of an age of the one of the tracks, visibility of the one of the tracks, and a number of the frames in which the one of the tracks has had the best rank based on the track metric.

10. The system of claim 1, wherein selecting the best ranked detection algorithm to be the base detection algorithm comprises:
- excluding from selection any of the blob detection algorithms that result in invisibility of the ball for one or more frames; and
- if all of the blob detection algorithms results in invisibility of the ball for the one or more frames, training a model based on the results of all of the blob detection algorithms to be the base detection algorithm.

11. A ball detection and tracking system, the system comprising:
- a plurality of visual detectors each having one or more light sensors for sensing a plurality of frames of images; and
- a mobile ball detection and tracking device coupled with the visual detectors for receiving the frames from the visual detection devices, the ball detection and tracking device having a processor and a non-transitory computer-readable memory storing a detection and tracking agent including:
  - a detection module that ranks a plurality of blob detection algorithms based on a detection metric, selects a best ranked detection algorithm to be a base detection algorithm, and uses the base detection algorithm to identify one or more first candidate blobs within a first frame of the frames and one or more second candidate blobs within a second frame of the frames; and
  - a tracking module that generates a track for each of the first candidate blobs including a predicted location of each of the tracks within the second frame, ranks each of the second candidate blobs based on a blob metric and each of the tracks based on a track metric, and assigns one of the second candidate blobs to a best ranked one of the tracks if the assignment satisfies a cost threshold as measured by a cost function except when the predicted location of one of the tracks lies within one of the second blobs, the tracking module assigns the one of the second blobs to the one of the tracks even if assigning a different one of the second blobs would be more cost efficient as measured by the cost function.

12. A mobile ball detection and tracking device, the device comprising:
- a processor;
- a plurality of visual detectors each having one or more light sensors for sensing a plurality of frames of images; and
- a non-transitory computer-readable memory storing a detection and tracking agent including:

a detection module that ranks a plurality of blob detection algorithms based on a detection metric, selects the best ranked detection algorithm to be a base detection algorithm, and uses the base detection algorithm to identify one or more first candidate blobs within a first frame of the frames and one or more second candidate blobs within a second frame of the frames; and a tracking module that generates a track for each of the first candidate blobs including a predicted location of each of the tracks within the second frame, ranks each of the second candidate blobs based on a blob metric and each of the tracks based on a track metric, and assigns one of the second candidate blobs to the best ranked one of the tracks if the assignment satisfies a cost threshold as measured by a cost function:

wherein the cost threshold is dynamically adjusted each time one of the blobs is associated with one of the tracks based on a cost of associating the one of the blobs with the one of the tracks as measured by the cost function.

13. The device of claim 12, wherein the tracking module determines if any of the second candidate blobs satisfy the cost threshold for the best ranked one of the tracks, and of those that do satisfy the cost threshold, assigns the second blob having the best rank to the best ranked one of the tracks.

14. The device of claim 13, wherein, at each iteration, after excluding any of the second candidate blobs that have already been assigned and any of the tracks that have been assigned to, the tracking module iteratively:
  determines if any of the second candidate blobs satisfy the cost threshold for the best ranked one of the tracks; and
  of those that do satisfy the cost threshold, assigns the second blob having the best rank to the best ranked one of the tracks until all of the tracks have been assigned to.

15. The device of claim 12, wherein after using the base detection algorithm, the detection module:
  uses one or more other detection algorithms of the plurality of detection algorithms to identify one or more other first candidate blobs within a first frame of the frames and one or more other second candidate blobs within a second frame of the frames;
  classifies one of the second blobs as a ball blob, and for each of the other detection algorithms, classifies one of the other second blobs identified by the other detection algorithm as other ball blobs; and
  combines the characteristics of the ball blob and each of the other ball blobs to generate a unionized blob.

16. The device of claim 12, wherein the second frame has an initial exposure level, the detection module:
  adjusts the second frame to have a second exposure level and uses the base detection algorithm to identify one or more other second candidate blobs within the second frame as adjusted;
  classifies one of the second blobs as a ball blob and one of the other second blobs as another ball blob; and
  creates a unionized ball blob that only includes pixels that are common to both the ball blob and the other ball blob.

17. The device of claim 12, wherein the tracking module selects the cost function from a plurality of stored cost functions based on a cost score of each of the cost functions.

18. The device of claim 12, wherein the tracking module determines if the assigning of the one of the second candidate blobs to the best ranked one of the tracks satisfies a second cost threshold as measured by a second cost function and refrains from making the assignment if the assignment does not satisfy the second cost threshold.

19. The device of claim 12, wherein the tracking module refrains from generating a track for one or more of the first blobs if the blobs do not satisfy a blob metric threshold as measured by the blob metric.

20. The device of claim 12, wherein the tracking module determines whether one of the tracks is a ball track based on one or more of a group consisting of an age of the one of the tracks, visibility of the one of the tracks, and a number of the frames in which the one of the tracks has had the best rank based on the track metric.

21. A mobile ball detection and tracking device, the device comprising:
  a processor;
  a plurality of visual detectors each having one or more light sensors for sensing a plurality of frames of images; and
  a non-transitory computer-readable memory storing a detection and tracking agent including:
    a detection module that ranks a plurality of blob detection algorithms based on a detection metric, selects the best ranked detection algorithm to be a base detection algorithm, and uses the base detection algorithm to identify one or more first candidate blobs within a first frame of the frames and one or more second candidate blobs within a second frame of the frames; and
    a tracking module that generates a track for each of the first candidate blobs including a predicted location of each of the tracks within the second frame, ranks each of the second candidate blobs based on a blob metric and each of the tracks based on a track metric, and assigns one of the second candidate blobs to the best ranked one of the tracks if the assignment satisfies a cost threshold as measured by a cost function except when the predicted location of one of the tracks lies within one of the second blobs, the tracking module assigns the one of the second blobs to the one of the tracks even if assigning a different one of the second blobs would be more cost efficient as measured by the cost function.

22. A method of detecting and tracking a ball, the method comprising:
  sensing a plurality of frames of images with a plurality of visual detectors each having one or more light sensors;
  receiving the frames with a mobile ball detection and tracking device;
  ranking a plurality of blob detection algorithms based on a detection metric, selecting the best ranked detection algorithm to be a base detection algorithm, and using the base detection algorithm to identify one or more first candidate blobs within a first frame of the frames and one or more second candidate blobs within a second frame of the frames with the ball detection and tracking device;
  generating a track for each of the first candidate blobs including a predicted location of each of the tracks within the second frame, ranking each of the second candidate blobs based on a blob metric and each of the tracks based on a track metric, and assigning one of the second candidate blobs to the best ranked one of the tracks if the assignment satisfies a cost threshold as measured by a cost function with the ball detection and tracking device; and dynamically adjusting the cost threshold each time one of the blobs is associated with one of the tracks based on a cost of associating the one of the blobs with the one of the tracks as measured by the cost function.

23. The method of claim 22, further comprising determining if any of the second candidate blobs satisfy the cost threshold for the best ranked one of the tracks, and of those that do satisfy the cost threshold, assigning the second blob having the best rank to the best ranked one of the tracks.

24. The method of claim 23, further comprising, at each iteration, after excluding any of the second candidate blobs that have already been assigned and any of the tracks that have been assigned to, iteratively:
   determining if any of the second candidate blobs satisfy the cost threshold for the best ranked one of the tracks; and
   of those that do satisfy the cost threshold, assigning the second blob having the best rank to the best ranked one of the tracks until all of the tracks have been assigned to.

25. The method of claim 22, further comprising, after using the base detection algorithm, using one or more other detection algorithms of the plurality of detection algorithms to identify one or more other first candidate blobs within a first frame of the frames and one or more other second candidate blobs within a second frame of the frames; classifying one of the second blobs as a ball blob, and for each of the other detection algorithms, classifies one of the other second blobs identified by the other detection algorithm as other ball blobs; and combining the characteristics of the ball blob and each of the other ball blobs to generate a unionized blob.

26. The method of claim 22, wherein the second frame has an initial exposure level, further comprising:
   adjusting the second frame to have a second exposure level and uses the base detection algorithm to identify one or more other second candidate blobs within the second frame as adjusted;
   classifying one of the second blobs as a ball blob and one of the other second blobs as another ball blob; and
   creating a unionized ball blob that only includes pixels that are common to both the ball blob and the other ball blob.

27. The method of claim 22, further comprising selecting the cost function from a plurality of stored cost functions based on a cost score of each of the cost functions.

28. The method of claim 22, further comprising determining if the assigning of the one of the second candidate blobs to the best ranked one of the tracks satisfies a second cost threshold as measured by a second cost function and refraining from making the assignment if the assignment does not satisfy the second cost threshold.

29. The method of claim 22, further comprising refraining from generating a track for one or more of the first blobs if the blobs do not satisfy a blob metric threshold as measured by the blob metric.

30. The method of claim 22, further comprising determining with the tracking module whether one of the tracks is a ball track based on one or more of a group consisting of an age of the one of the tracks, visibility of the one of the tracks, and a number of the frames in which the one of the tracks has had the best rank based on the track metric.

31. A method of detecting and tracking a ball, the method comprising:
   sensing a plurality of frames of images with a plurality of visual detectors each having one or more light sensors;
   receiving the frames with a mobile ball detection and tracking device;
   ranking a plurality of blob detection algorithms based on a detection metric, selecting the best ranked detection algorithm to be a base detection algorithm, and using the base detection algorithm to identify one or more first candidate blobs within a first frame of the frames and one or more second candidate blobs within a second frame of the frames with the ball detection and tracking device;
   generating a track for each of the first candidate blobs including a predicted location of each of the tracks within the second frame, ranking each of the second candidate blobs based on a blob metric and each of the tracks based on a track metric; and
   assigning one of the second candidate blobs to the best ranked one of the tracks if the assignment satisfies a cost threshold as measured by a cost function with the ball detection and tracking device except when the predicted location of one of the tracks lies within one of the second blobs, assigning the one of the second blobs to the one of the tracks even if assigning a different one of the second blobs would be more cost efficient as measured by the cost function.

* * * * *